United States Patent
Koike et al.

(10) Patent No.: US 10,407,251 B2
(45) Date of Patent: Sep. 10, 2019

(54) WORKPIECE HANDLING APPARATUS, WORKPIECE HANDLING SYSTEM, METHOD FOR DISCHARGING WORKPIECE, METHOD FOR SUPPLYING WORKPIECE, AND METHOD FOR STORING WORKPIECE

(71) Applicant: KABUSHIKI KAISHA YASKAWA DENKI, Kitakyushu-shi (JP)

(72) Inventors: Haruhiko Koike, Kitakyushu (JP); Kanji Watanabe, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 0 days.

(21) Appl. No.: 15/856,060

(22) Filed: Dec. 28, 2017

(65) Prior Publication Data

US 2018/0201450 A1  Jul. 19, 2018

(30) Foreign Application Priority Data

Jan. 18, 2017 (JP) ................................. 2017-006474
Jun. 2, 2017 (JP) ................................. 2017-109720

(51) Int. Cl.
*B65G 37/02* (2006.01)
*B65G 47/51* (2006.01)

(52) U.S. Cl.
CPC ......... *B65G 47/5181* (2013.01); *B65G 37/02* (2013.01)

(58) Field of Classification Search
CPC . B65G 1/02; B65G 1/026; B65G 1/04; B65G 37/02; B65G 47/51
USPC ............................................. 198/347.1–347.4
See application file for complete search history.

(56) References Cited

U.S. PATENT DOCUMENTS

| 5,441,146 A * | 8/1995 | Ziegler | B65B 59/005 198/347.2 |
| 6,478,137 B2 * | 11/2002 | Hebels | A24C 5/352 198/347.1 |
| 6,516,935 B1 * | 2/2003 | McLennan | B23P 19/001 198/346.1 |

(Continued)

FOREIGN PATENT DOCUMENTS

| JP | 02-295804 | 12/1990 |
| JP | 04-093198 U | 8/1992 |

(Continued)

OTHER PUBLICATIONS

Japanese Office Action for corresponding JP Application No. 2017-109720, dated Apr. 2, 2018 (w/English machine translation).

(Continued)

*Primary Examiner* — James R Bidwell
(74) *Attorney, Agent, or Firm* — Mori & Ward, LLP

(57) ABSTRACT

A workpiece handling apparatus is configured to supply and discharge a workpiece to and from a first conveyor configured to convey the workpiece. The workpiece handling apparatus includes a storage, a conveyance device, and a workpiece transfer robot. In the storage, a case for the workpiece is storable. The conveyance device is configured to convey the case between the storage and a predetermined work position. The workpiece transfer robot is configured to transfer the workpiece between the case conveyed to the work position and the first conveyor.

19 Claims, 18 Drawing Sheets

(56) References Cited

U.S. PATENT DOCUMENTS

| | | | | |
|---|---|---|---|---|
| 6,688,454 B2* | 2/2004 | Cho | ................... | B65G 65/00 |
| | | | | 198/347.1 |
| 6,688,839 B1* | 2/2004 | Hirschek | ................ | B65B 21/06 |
| | | | | 198/347.1 |
| 6,718,727 B2* | 4/2004 | Focke | ................... | B65G 37/02 |
| | | | | 198/347.1 |
| 6,729,836 B2* | 5/2004 | Stingel, III | ............. | B65G 1/08 |
| | | | | 198/347.1 |
| 6,799,411 B2* | 10/2004 | Gasser | ................... | B65B 23/16 |
| | | | | 198/347.4 |
| 7,637,712 B2* | 12/2009 | Varney | ................... | B07C 3/008 |
| | | | | 198/347.2 |
| 7,958,987 B2* | 6/2011 | Monti | ..................... | B65B 57/16 |
| | | | | 198/347.1 |
| 8,925,709 B2* | 1/2015 | Studer | ................... | B65G 1/023 |
| | | | | 198/347.1 |
| 2003/0150193 A1 | 8/2003 | Gasser et al. | | |
| 2008/0019811 A1* | 1/2008 | Krolak | ............. | H01L 21/67017 |
| | | | | 414/304 |

FOREIGN PATENT DOCUMENTS

| | | |
|---|---|---|
| JP | 07-172518 | 7/1995 |
| JP | 2003-104551 | 4/2003 |
| KR | 10-2014-0017306 | 2/2014 |
| WO | WO 2013/105900 | 7/2013 |

OTHER PUBLICATIONS

Korean Office Action for corresponding KR Application No. 10-2018-0005619, dated May 28, 2019 (w/ machine translation).

* cited by examiner

WORKPIECE HANDLING APPARATUS, WORKPIECE HANDLING SYSTEM, METHOD FOR DISCHARGING WORKPIECE, METHOD FOR SUPPLYING WORKPIECE, AND METHOD FOR STORING WORKPIECE

CROSS-REFERENCE TO RELATED APPLICATIONS

The present application claims priority under 35 U.S.C. § 119 to Japanese Patent Application Nos. 2017-006474, filed Jan. 18, 2017, and 2017-109720, filed Jun. 2, 2017. The contents of these applications are incorporated herein by reference in their entirety.

BACKGROUND

Field of the Invention

The embodiments disclosed herein relate to a workpiece handling apparatus, a workpiece handling system, a method for discharging a workpiece, a method for supplying a workpiece, and a method for storing a workpiece.

Discussion of the Background

JP7-172518A discloses a picking system that includes a parent-box conveyor, a small-box conveyor, and a junction. The parent-box conveyor conveys parent boxes. The small-box conveyor conveys small boxes for storing cases. The junction is a place at which the parent-box conveyor and the small-box conveyor meet each other. The cases in the small boxed are put into a parent box, which is then shipped. The empty small boxes are conveyed again on the small-box conveyor to be reused.

SUMMARY

According to one aspect of the present disclosure, a workpiece handling apparatus is configured to supply and discharge a workpiece to and from a first conveyor configured to convey the workpiece. The workpiece handling apparatus includes a storage, a conveyance device, and a workpiece transfer robot. In the storage, a case for the workpiece is storable. The conveyance device is configured to convey the case between the storage and a predetermined work position. The workpiece transfer robot is configured to transfer the workpiece between the case conveyed to the work position and the first conveyor.

According to another aspect of the present disclosure, a workpiece handling system includes a first conveyor and a workpiece handling apparatus. The first conveyor is configured to convey a workpiece. The workpiece handling apparatus is configured to supply and discharge the workpiece to and from the first conveyor. The workpiece handling apparatus includes a storage, a conveyance device, and a workpiece transfer robot. In the storage, a case for the workpiece is storable. The conveyance device is configured to convey the case between the storage and a predetermined work position. The workpiece transfer robot is configured to transfer the workpiece between the case conveyed to the work position and the first conveyor.

According to another aspect of the present disclosure, a method is for discharging a workpiece from a first conveyor using a workpiece handling apparatus. The method includes conveying an empty case, contained in a first storage, from the first storage to a work position. The workpiece is transferred from the first conveyor to the case. The case containing the workpiece is conveyed from the work position to a second storage.

According to another aspect of the present disclosure, a method is for supplying a workpiece to a first conveyor using a workpiece handling apparatus. The method includes conveying a case containing the workpiece and contained in a second storage from the second storage to a work position. The workpiece is transferred from the case to the first conveyor. The case without the workpiece is conveyed from the work position to a first storage.

According to the other aspect of the present disclosure, a method is for storing a workpiece, conveyed on a first conveyor, using a workpiece handling apparatus. The method includes conveying an empty case, contained in a first storage, from the first storage to a work position. The workpiece is transferred from the first conveyor to the case. The case containing the workpiece is conveyed from the work position to a second storage. The case in the second storage is conveyed to the work position. The workpiece is transferred from the case to the first conveyor. The case without the workpiece is conveyed from the work position to the first storage.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
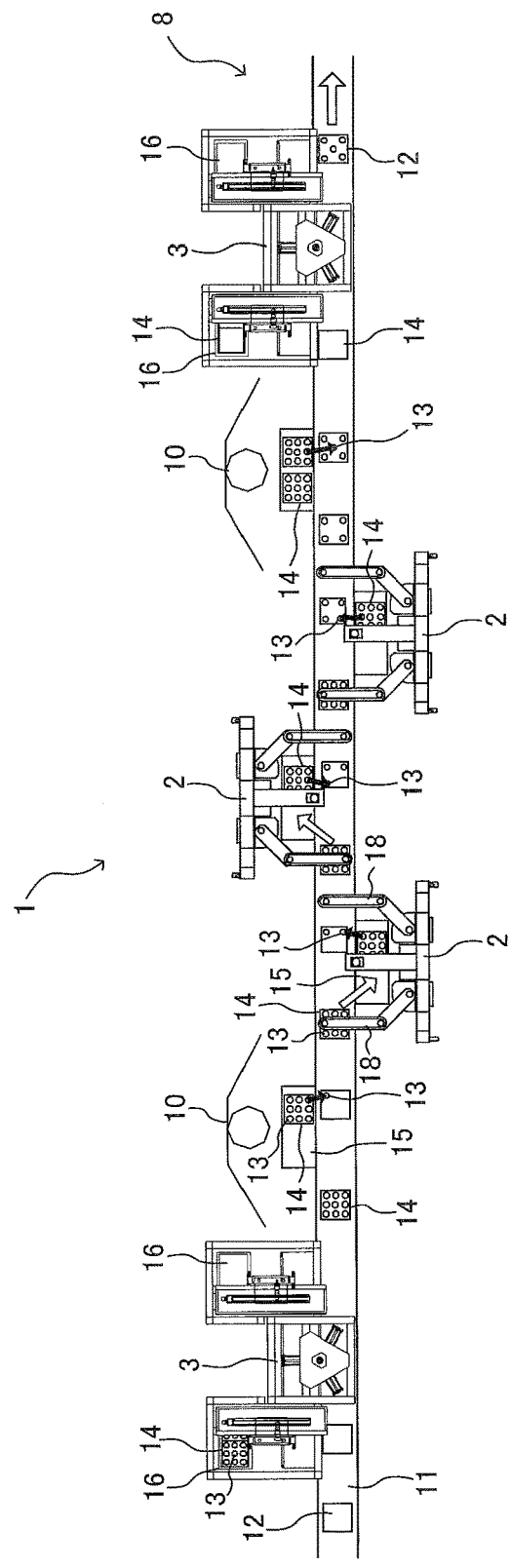
FIG. 1 illustrates a general arrangement of an exemplary work line including workpiece handling apparatuses according to a first embodiment.

The embodiments will now be described with reference to the accompanying drawings, wherein like reference numerals designate corresponding or identical elements throughout the various drawings.

To facilitate the description of the workpiece handling apparatus and associated elements, the following description uses "up", "down", "right", "left", "front", "rear", and other direction indicating terms. These terms of direction, however, are not intended as limiting the relative positions of the workpiece handling apparatus and associated elements.

1. First Embodiment

A first embodiment will be described.
1-1. General Arrangement of Work Line
By referring to FIG. 1, description will be made with regard to a general arrangement of an exemplary work line 1, which includes workpiece handling apparatuses 3 according to a first embodiment. The work line 1 is for food arrangement work to arrange food products 13 in a food vessel 12.

The work line 1 includes a workpiece conveyor 11 (which is a non-limiting example of the first conveyor recited in the appended claims), a plurality of work robots 2 (three work robots 2 are illustrated in FIG. 1), and a plurality of workpiece handling apparatuses 3 (two workpiece handling apparatuses 3 are illustrated in FIG. 1). The work robots 2 and the workpiece handling apparatuses 3 are disposed near the workpiece conveyor 11. In the embodiment illustrated in FIG. 1, a plurality of workers 10 (two workers 10 are illustrated in FIG. 1) are also disposed near the workpiece conveyor 11, in addition to the work robots 2 and the workpiece handling apparatuses 3. It will be understood that the workers 10 may be replaced with the work robots 2. The workpiece conveyor 11 and the workpiece handling apparatuses 3 constitute a workpiece handling system 8.

As illustrated in FIG. 1, the workpiece handling apparatuses 3, the workers 10, and the work robots 2 are arranged approximately at equal intervals along the workpiece conveyor 11 on the work line 1. Specifically, as seen from the upstream side (left side of FIG. 1) of the work line 1, the first element is a workpiece handling apparatus 3, the second element is a worker 10, the third to fifth elements are work robots 2, the sixth element is a worker 10, and the seventh element is a workpiece handling apparatus 3. Among these elements, the two workpiece handling apparatuses 3, the two workers 10, and one work robot 2 are disposed at one side of the width of the workpiece conveyor 11 (upper side of FIG. 1), while the other two work robots 2 are disposed at the other side of the width of the workpiece conveyor 11 (lower side of FIG. 1). It will be understood that the arrangement illustrated in FIG. 1 is provided for exemplary purposes only, and other arrangement may be used.

The workpiece conveyor 11 conveys food vessels 12 and food trays 14 (which are non-limiting examples of the workpiece recited in the appended claims). Each workpiece handling apparatus 3 supplies and/or discharges food trays 14 to and from the workpiece conveyor 11. The work robots 2 and the workers 10 arrange food products 13 in the food vessels 12.

To the workpiece conveyor 11, empty food vessels 12 are supplied at convenient timings from a supplier device, not illustrated, or manually at an upstream position that is further upstream than the first workpiece handling apparatus 3 from the upstream side. Also to the workpiece conveyor 11, food trays 14 containing food products 13 are supplied from the upstream workpiece handling apparatus 3. With this configuration, the workpiece conveyor 11 sequentially conveys a mixed line of food vessels 12 and food trays 14 toward the downstream side (right side of FIG. 1). The workpiece handling apparatuses 3 will be detailed later.

The food trays 14 supplied by the first workpiece handling apparatus 3 from the upstream side contain food products 13, which are ready-to-eat food products necessary in the food arrangement work. One food tray 14 contains a plurality of food products 13 of the same kind. There are a plurality of kinds of food products 13, with different kinds of food products 13 contained in different food trays 14. In this embodiment, there are five kinds of food products 13 to be arranged in the food vessels 12, and each of the work robots 2 and the workers 10 arranges one of the five kinds of food products 13. A tray table 15 is disposed between each worker 10 and the workpiece conveyor 11 and between each work robot 2 and the workpiece conveyor 11. The tray table 15 holds food trays 14.

Each work robot 2 is a two-arm robot, with two robot arms 18. It should be noted, however, that each work robot 2 may be a single-arm robot. Examples of each work robot 2 include, but are not limited to, a horizontal multi-articular (SCARA) robot, a parallel link robot, a linear motion robot, and a vertical multi-articular robot. The two robot arms 18 protrude over the workpiece conveyor 11 with one robot arm 18 at the upstream side and the other robot arm 18 at the downstream side, and are capable of performing the food arrangement work independently, moving between the workpiece conveyor 11 and the tray table 15.

Each of the three work robots 2 and the two workers 10 is in charge of one kind of food products 13, which depends on the order of this work robot 2 or worker 10 determined from the upstream side. That is, each work robot 2 or worker 10 arranges this kind of food products 13 in the food vessels 12.

Specifically, when a food tray 14 containing a first kind of food products 13 is flowing from the upstream on the workpiece conveyor 11 to near the worker 10 at the second position in the order from the upstream side, the worker 10 at the second position collects the food tray 14 over to the tray table 15 and holds the food tray 14. Then, the worker 10 at the second position picks a food product 13 from the food tray 14 held on the tray table 15, moves the food product 13 to a predetermined first food arrangement position, and arranges the food product 13 in an empty food vessel 12 flowing to near the worker 10 at the second position. As illustrated in FIG. 1, this arrangement operation of food products 13 by the workers 10 is indicated by solid arrows (this also applies in the following description).

When a food tray 14 containing a second kind of food products 13 is flowing from the upstream on the workpiece conveyor 11 to near the work robot 2 at the third position in the order from the upstream side, the work robot 2 at the third position collects the food tray 14 over to the tray table 15 using the robot arms 18 and holds the food tray 14. In FIG. 1, this collecting operation of food trays 14 by the robot arms 18 is indicated by outlined arrows (this also applies in the following description). Then, the work robot 2 at the third position picks, using the robot arms 18, a food product 13 from the food tray 14 held on the tray table 15, moves the food product 13 to a predetermined second food arrangement position, and arranges the food product 13 in the food vessel 12 in which the first kind of food product 13 is arranged and which is flowing to near the work robot 2 at the third position. In FIG. 1, this arrangement operation of food products 13 by the robot arms 18 is indicated by solid arrows (this also applies in the following description).

When a food tray 14 containing a third kind of food products 13 is flowing from the upstream on the workpiece conveyor 11 to near the work robot 2 at the fourth position in the order from the upstream side, the work robot 2 at the fourth position collects the food tray 14 over to the tray table 15 using the robot arms 18 and holds the food tray 14. Then, the work robot 2 at the fourth position picks, using the robot arms 18, a food product 13 from the food tray 14 held on the tray table 15, moves the food product 13 to a predetermined third food arrangement position, and arranges the food product 13 in the food vessel 12 in which the first and second kinds of food products 13 are arranged and which is flowing to near the work robot 2 at the fourth position.

When a food tray 14 containing a fourth kind of food products 13 is flowing from the upstream on the workpiece conveyor 11 to near the work robot 2 at the fifth position in the order from the upstream side, the work robot 2 at the fifth position collects the food tray 14 over to the tray table 15 using the robot arms 18 and holds the food tray 14. Then, the work robot 2 at the fifth position picks, using the robot arms 18, a food product 13 from the food tray 14 held on the tray table 15, moves the food product 13 to a predetermined fourth food arrangement position, and arranges the food product 13 in the food vessel 12 in which the first to third kinds of food products 13 are arranged and which is flowing to near the work robot 2 at the fifth position.

When a food tray 14 containing a fifth kind of food products 13 is flowing from the upstream on the workpiece conveyor 11 to near the worker 10 at the sixth position in the order from the upstream side, the worker 10 at the sixth position collects the food tray 14 over to the tray table 15 and holds the food tray 14. Then, the worker 10 at the sixth position picks a food product 13 from the food tray 14 held on the tray table 15, moves the food product 13 to a predetermined fifth food arrangement position, and arranges the food product 13 in the food vessel 12 in which the first to fourth kinds of food products 13 are arranged and which is flowing to near the worker 10 at the sixth position.

When all the first to fifth kinds of food products 13 have been arranged in the food vessel 12, the arrangement operation of food products 13 is complete. The food vessel 12 done with the arrangement operation of food products 13 flows on the workpiece conveyor 11 to post-processing equipment, not illustrated, at the downstream side. A non-limiting example of post-processing is to put a cover on the food vessel 12. When the food tray 14 on the tray table 15 turns empty, after all the food products 13 have been removed from the food tray 14, the workers 10 and the work robots 2 return the empty food tray 14 to the workpiece conveyor 11 from the tray table 15. The returned empty food tray 14 is conveyed on the workpiece conveyor 11 and discharged (which may also be referred to as collected) out of the workpiece conveyor 11 by the downstream workpiece handling apparatus 3.

1-2. Configuration of Workpiece Handling Apparatus

An exemplary configuration of the workpiece handling apparatus 3 will be described by referring to FIGS. 2 to 5. To facilitate understanding of the structure of each element, the internal structures of elements such as a cover 56, a slider 63, and linear bushes 64, described later, can be seen through in FIGS. 3 to 5.

1-2-1. General Arrangement

Figure 2:
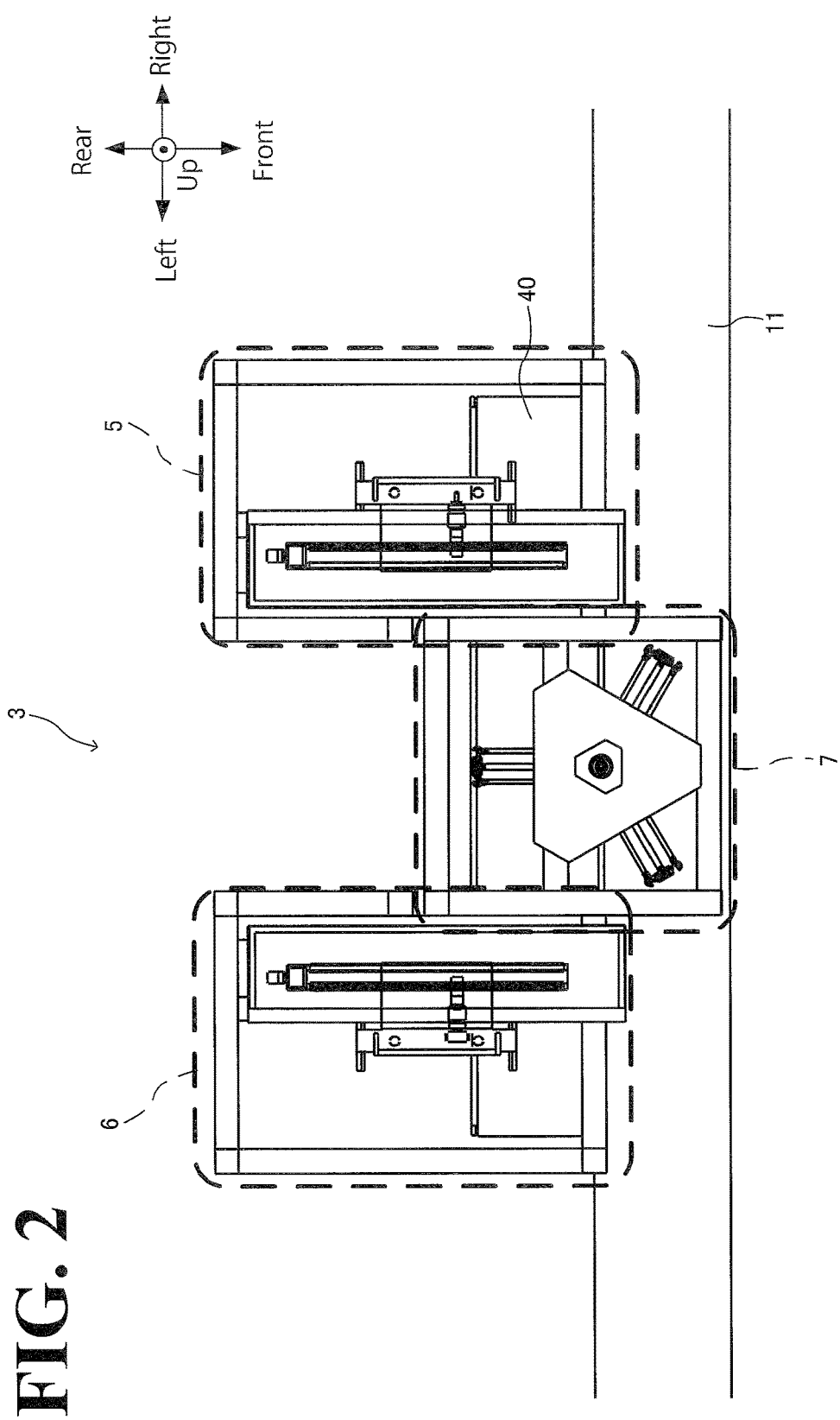
FIG. 2 illustrates an exemplary unit configuration of one workpiece handling apparatus according to the first embodiment.

As illustrated in FIG. 2, the workpiece handling apparatus 3 is roughly made up of four units, namely, a first case transfer unit 5, a second case transfer unit 6, a workpiece transfer unit 7, and a case conveyor 40 (which is a non-limiting example of the second conveyor recited in the appended claims). The units are detachably connected to each other using connecting members such as bolts.

The first case transfer unit 5 is disposed at the downstream side (right side of FIG. 2) of the workpiece transfer unit 7 in the conveyance direction of the workpiece conveyor 11. The second case transfer unit 6 is disposed at the upstream side (left side of FIG. 2) of the workpiece transfer unit 7. The workpiece transfer unit 7 is disposed between the first case transfer unit 5 and the second case transfer unit 6, and includes a workpiece transfer robot 30, described later, which protrudes over the workpiece conveyor 11. The case conveyor 40 extends between the first case transfer unit 5 and the second case transfer unit 6 across the workpiece transfer unit 7, and has a passage along the conveyance direction of the workpiece conveyor 11 (which is right and left directions in this embodiment and which is also referred to as X axis direction). At both ends in the conveyance direction, the case conveyor 40 is supported by columns 47, which have adjusters 47a at lower ends. Thus, the case conveyor 40 is disposed on floor FL. The first case transfer unit 5 and the second case transfer unit 6 are movable by a horizontal movement mechanism 60, described later, in movement directions (front and rear directions in this embodiment) approximately perpendicular to the conveyance direction of the workpiece conveyor 11.

The first case transfer unit 5 and the second case transfer unit 6 are in such a relationship that one is the mirror image of the other. It should be noted, however, that the first case transfer unit 5 and the second case transfer unit 6 may have the same configurations. The first case transfer unit 5 includes a support frame 70R, and the second case transfer unit 6 includes a support frame 70L. The support frame 70R and the support frame 70L each have an approximately rectangular parallelepiped shape. The first case transfer unit 5 includes a first storage 21 and a first case transfer robot 41. The first storage 21 stores cases 16 that are disposed in the support frame 70R and that contain no food trays 14. The second case transfer unit 6 includes a second storage 22 and a second case transfer robot 42. The second storage 22 stores cases 16 that are disposed in the support frame 70L and that contain food trays 14. The support frames 70R and 70L are each provided with castered adjusters 71 at the lower ends of four corners of the frame.

The first storage 21 and the second storage 22 may be implemented by providing bottom plates in the support frames 70R and 70L so that cases 16 are placeable on the bottom plates. Another possible example is to provide a space to accommodate dollies loaded with cases 16, instead of providing bottom plates.

The workpiece transfer unit 7 includes a support frame 31, which has an approximately rectangular parallelepiped shape. In the support frame 31, the workpiece transfer robot 30 is disposed. When the workpiece transfer robot 30 discharges a food tray 14 from the workpiece conveyor 11, the workpiece transfer robot 30 transfers the food tray 14 from the workpiece conveyor 11 to a case 16 taken out of the first storage 21. When the workpiece transfer robot 30 supplies a food tray 14 to the workpiece conveyor 11, the workpiece transfer robot 30 transfers a food tray 14 from a case 16 taken out of the second storage 22 to the workpiece conveyor 11.

The case conveyor 40, the first case transfer robot 41, and the second case transfer robot 42 constitute a conveyance device 48. The case conveyor 40 conveys cases 16 along the passage of the case conveyor 40, which includes a work position 46 of the workpiece transfer robot 30 (the work position 46 is located below the workpiece transfer robot 30 illustrated in FIG. 3). The first case transfer robot 41 transfers cases 16 that contain no food trays 14 between the first storage 21 and the case conveyor 40. The second case transfer robot 42 transfers cases 16 that contain food trays 14 between the second storage 22 and the case conveyor 40.

1-2-2. First Case Transfer Unit, Second Case Transfer Unit

Figure 4:
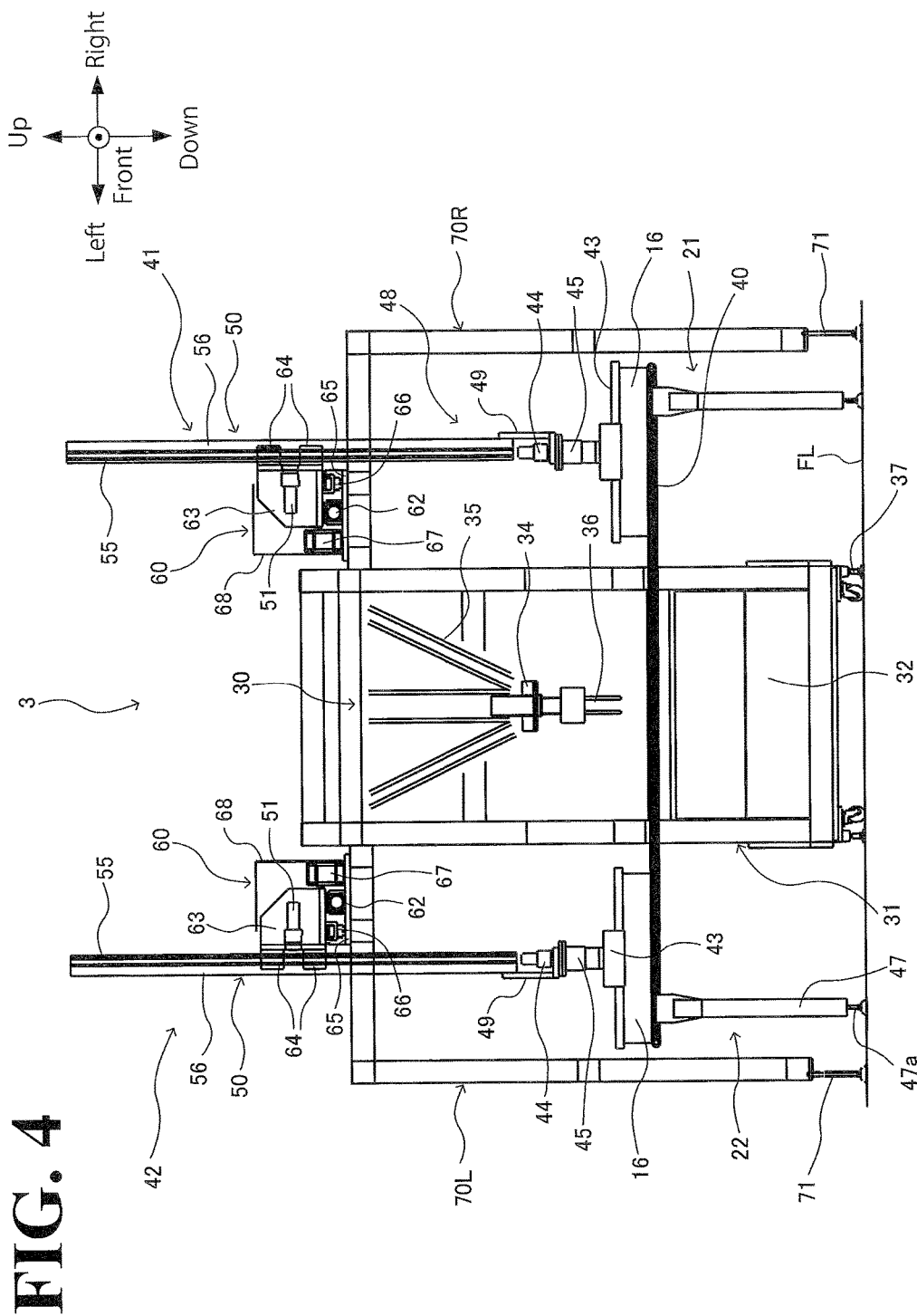
FIG. 4 is a front view of the workpiece handling apparatus according to the first embodiment illustrating an exemplary configuration of this workpiece handling apparatus.
Figure 5:
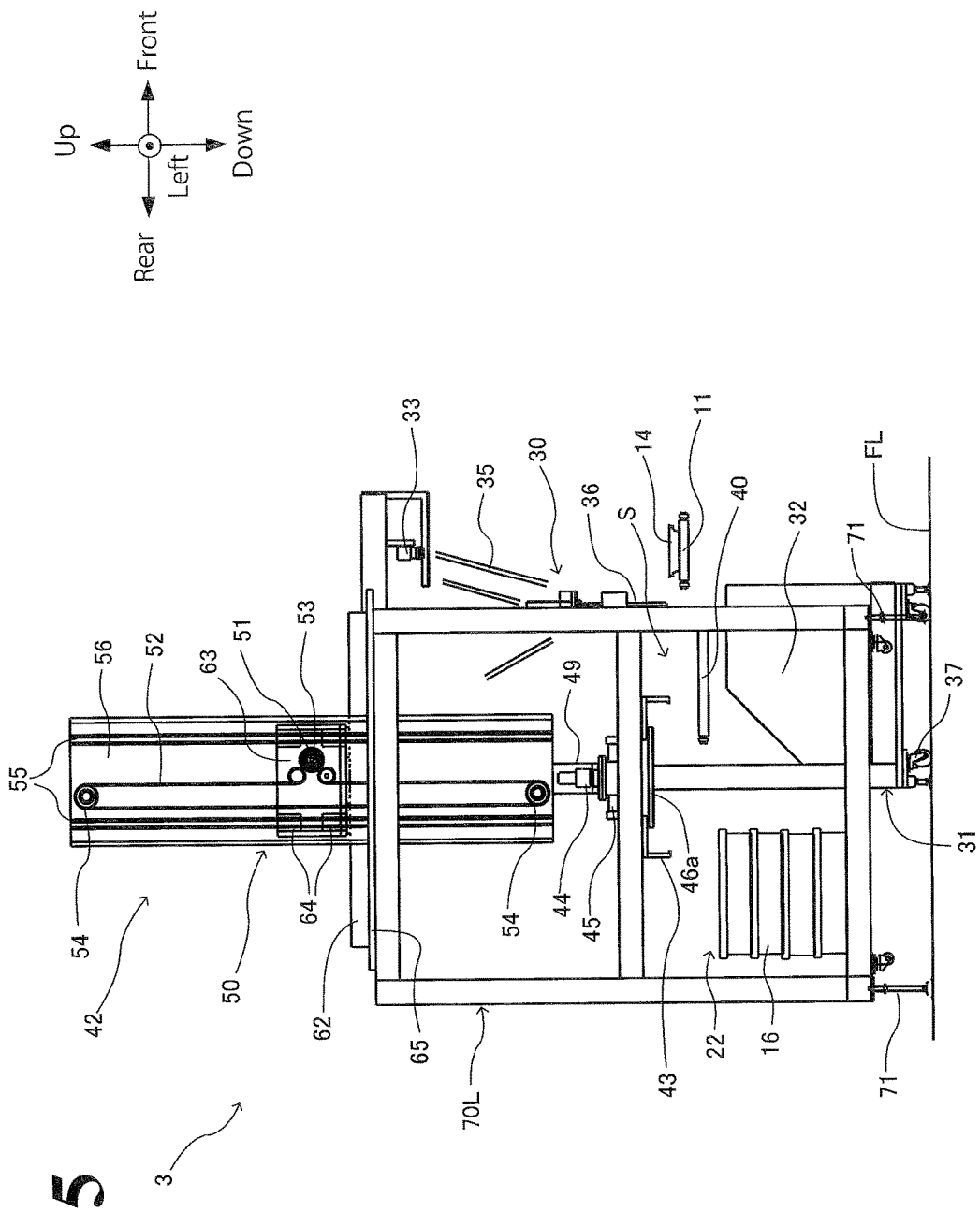
FIG. 5 is a left side view of the workpiece handling apparatus according to the first embodiment illustrating an exemplary configuration of this workpiece handling apparatus.

As illustrated in FIGS. 4 and 5, the first case transfer robot 41 of the first case transfer unit 5 and the second case transfer robot 42 of the second case transfer unit 6 each include a robot hand 43, a vertical movement mechanism 50, and the horizontal movement mechanism 60. The robot hand 43 is capable of holding a case 16. The vertical movement mechanism 50 moves the robot hand 43 in vertical directions (also referred to as Z axis direction). The horizontal movement mechanism 60 moves the robot hand 43 in horizontal directions perpendicular to the vertical directions (the horizontal directions are the front and rear directions in the first embodiment and are also referred to as Y axis direction). The vertical movement mechanism 50 is movable in the front and rear directions together with the robot hand 43 by the horizontal movement mechanism 60.

As illustrated in FIG. 5, the vertical movement mechanism 50 includes a Z axis motor 51, a belt 52, a drive pulley 53, a plurality of idler pulleys 54, and the cover 56. The cover 56 includes two hollow shafts 55, which are guide members extending between upper and lower ends of the cover 56. Between the two hollow shafts 55, a predetermined gap is provided in the front and rear directions, and the two hollow shafts 55 are covered by the belt 52, the drive pulley 53, the idler pulleys 54, and the cover 56. The cover 56 is open on the side of the workpiece transfer unit 7. Each hollow shaft 55 penetrates two, upper and lower linear bushes 64 of the slider 63 of the horizontal movement mechanism 60. Thus, the hollow shaft 55 is movable in the vertical directions relative to the slider 63. The Z axis motor 51 is mounted on the slider 63 and drives the drive pulley 53, which is fixed to the output shaft of the Z axis motor 51. The belt 52 is looped around elements including the drive pulley 53 and the idler pulleys 54, which are disposed at upper and lower positions in the cover 56.

Figure 3:
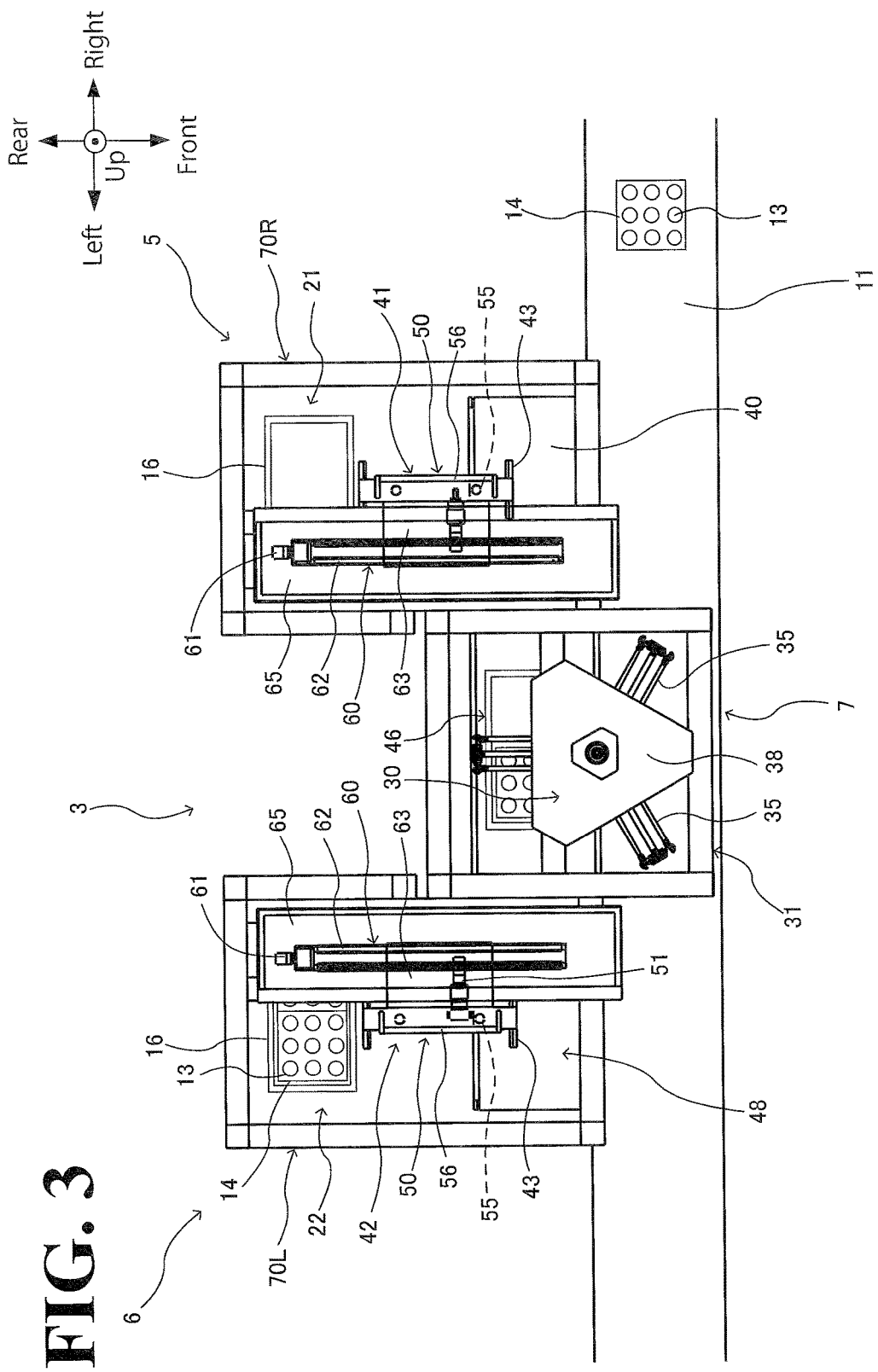
FIG. 3 is a plan view of the workpiece handling apparatus according to the first embodiment illustrating an exemplary configuration of this workpiece handling apparatus.

As illustrated in FIG. 3, the horizontal movement mechanism 60 includes a Y axis motor 61, a guide rail 62, and the slider 63. The guide rail 62 is disposed on each of bases 65, which are disposed on the support frames 70R and 70L. A non-limiting example of the Y axis motor 61 is a rotary motor capable of moving the slider 63 in the front and rear directions along the guide rail 62 using, for example, a ball screw mechanism. Other possible examples of the Y axis motor 61 include a linear motor and an air cylinder (which can be used provided that front and rear stopping positions are determined). As illustrated in FIG. 4, a linear encoder 66 (not illustrated in FIGS. 3 and 5) is disposed next to and in approximately parallel to the guide rail 62 on the base 65. The linear encoder 66 detects a displacement of the slider 63 caused by the Y axis motor 61. At the opposite side of the linear encoder 66 across the guide rail 62 on the base 65, a cable rack 67 (not illustrated in FIG. 3) is disposed. The cable rack 67 is for wiring cables of the Z axis motor 51 and other elements. A cover 68 (not illustrated in FIGS. 3 and 5) covers elements including part of the slider 63, the guide rail 62, and the cable rack 67.

The Z axis motor 51 causes the belt 52 of the vertical movement mechanism 50 to move, making the cover 56 move in a vertical direction relative to the slider 63 along the hollow shafts 55. Thus, the robot hand 43 moves in a vertical direction. It will be understood that the method of driving the vertical movement mechanism 50 will not be limited to the use of a belt; other possible examples include use of a rack-and-pinion and use of a ball screw. The Y axis motor 61 of the horizontal movement mechanism 60 causes the slider 63 to move in the front or rear direction along the guide rail 62, making the cover 56 move in the front or rear direction. Thus, the robot hand 43 moves in the front or rear direction.

As illustrated in FIGS. 4 and 5, the robot hand 43 is mounted approximately on the center, in the front and rear directions, of the lower end of the cover 56 through a connecting member 49 and an air chuck 45. At the lower end of the air chuck 45, an air chuck cover 46a is disposed. The air chuck cover 46a prevents falling of oil, dust, and other kinds of waste caused from elements including a θ axis motor 44. The air chuck 45 utilizes air pressure to cause the robot hand 43 to open and close so as to hold a case 16 on both its sides. The θ axis motor 44 (which is a non-limiting example of the turning mechanism recited in the appended claims) causes the air chuck 45 and the robot hand 43 to turn about an axis (Z axis) approximately parallel to the vertical directions. This configuration enables the first case transfer robot 41 and the second case transfer robot 42 to turn the case 16 held by the robot hand 43 about the Z axis. It will be understood that the robot hand 43 may not necessarily be driven pneumatically but may be driven electrically. Also, the θ axis motor 44, which is used to turn the robot hand 43, may be replaced with a pneumatic rotary actuator, for example.

1-2-3. Workpiece Transfer Unit

As illustrated in FIGS. 4 and 5, the workpiece transfer unit 7 includes the support frame 31, the workpiece transfer robot 30, and a control box 32. The control box 32 accommodates a controller, not illustrated, that controls an operation of the workpiece transfer robot 30. As illustrated in FIG. 5, the support frame 31 supports the workpiece transfer robot 30 and the control box 32 with space S being defined between the workpiece transfer robot 30 and the control box 32 so that the case conveyor 40 is passed through the space S. Thus, the control box 32 is disposed under the case conveyor 40, and the workpiece transfer robot 30 is disposed over the case conveyor 40. Also as illustrated in FIG. 5, a workpiece detection camera 33 is disposed on the lower surface of a front portion the support frame 31 located at its upper part. The workpiece detection camera 33 detects objects, such as food trays 14, on the workpiece conveyor 11.

The workpiece transfer robot 30 is a parallel link robot made up of a base 38, a movable plate 34, three linkages 35, and a workpiece-holding hand 36. The base 38 is disposed at an upper portion of the support frame 31, and the movable plate 34 is disposed at a lower portion of the support frame 31. The three linkages 35 connect the base 38 and the movable plate 34 to each other. The workpiece-holding hand 36 is disposed at the lower end of the movable plate 34. The three linkages 35 are individually controllable by an actuator, not illustrated, of the base 38 to cause the movable plate 34 to freely move in three axis directions so that the movable plate 34 is positioned as desired. The support frame 31 is provided with castered adjusters 37 at the lower ends of four corners of the support frame 31. On the castered adjusters 37, the support frame 31 is disposed on the floor FL. It will be understood that the workpiece transfer robot 30 will not be limited to a parallel link robot. Other possible examples of the workpiece transfer robot 30 include a horizontal multi-articular (SCARA) robot, a linear motion robot, and a vertical multi-articular robot.

1-3. Exemplary Structure of Case for Food Tray

An exemplary structure of the case 16 will be described by referring to FIGS. 6 and 8.

Figure 6A:
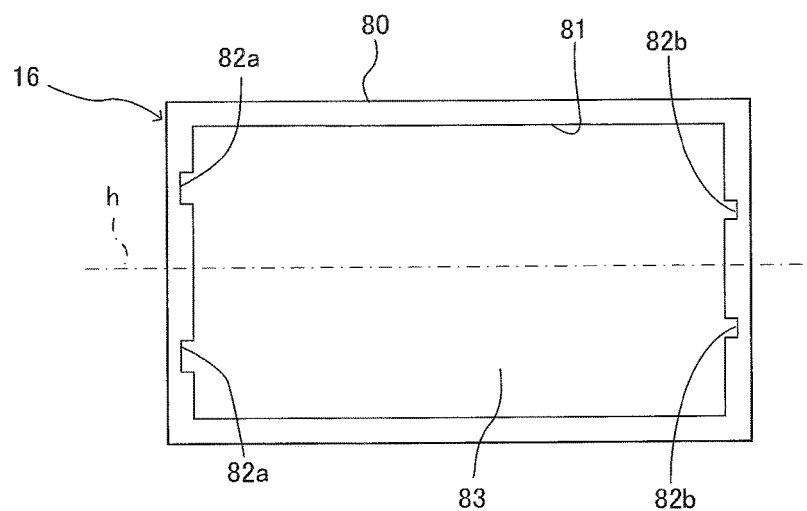
FIG. 6A is a plan view of a case illustrating an exemplary structure of the case.
Figure 6B:
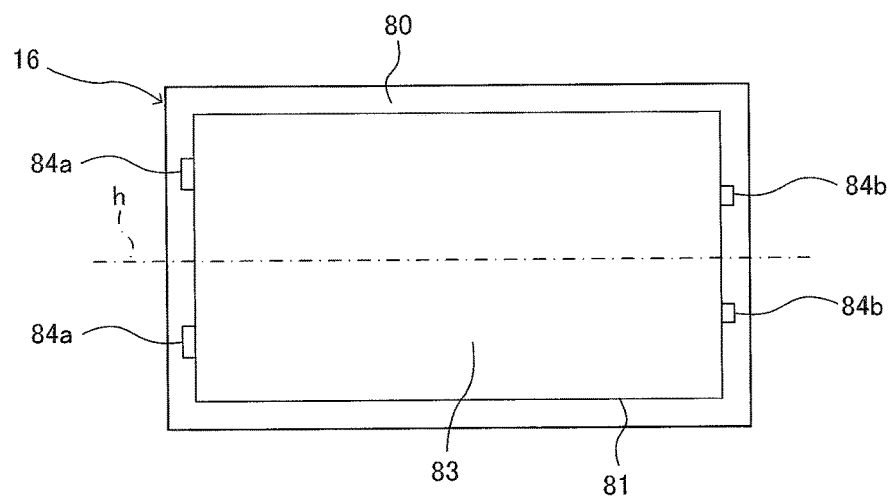
FIG. 6B is a bottom view of the case illustrating an exemplary structure of the case.

The case 16 is for containing a food tray 14, which is a workpiece. The case may also be referred to as a container or a tray. In the first storage 21 and the second storage 22, cases 16 are stacked on each other in the vertical directions. FIG. 6A is a plan view of the case 16 as seen from its opening side. FIG. 6B is a bottom view of the case 16 as seen from its bottom side. As illustrated in FIGS. 6A and 6B, the case 16 is an approximately rectangular box, and includes a body 81 and a brim 80. The body 81 is where food trays 14 are contained, and the brim 80 is formed around the opening of the body 81. The body 81 includes a bottom 83. On one shorter side (left shorter side in FIG. 6A) of the inner surface of the body 81, two cutout grooves 82a are disposed. On the other shorter side (right shorter side in FIG. 6A) of the inner surface of the body 81, two cutout grooves 82b are disposed. The cutout grooves 82a each have a greater cross-sectional area approximately orthogonal to the longitudinal direction of the groove. The cutout grooves 82b each have a smaller cross-sectional area approximately orthogonal to the longitudinal direction of the groove. The two cutout grooves 82a are approximately symmetric to each other with respect to center line h, which extends in the longitudinal direction of the case 16. Similarly, the two cutout grooves 82b are approximately symmetric to each other with respect to the center line h. The gap between the two cutout grooves 82a is greater than gap between the two cutout grooves 82b.

As illustrated in FIG. 6B, on one shorter side (left shorter side in FIG. 6B) of the outer surface of the body 81, two protrusions 84a are disposed. On the other shorter side (right shorter side in FIG. 6B) of the outer surface of the body 81, protrusions 84b are disposed. One protrusion 84a corresponds to the position and size of one cutout groove 82a, and one protrusion 84b corresponds to the position and size of one cutout groove 82b.

Figure 7A:
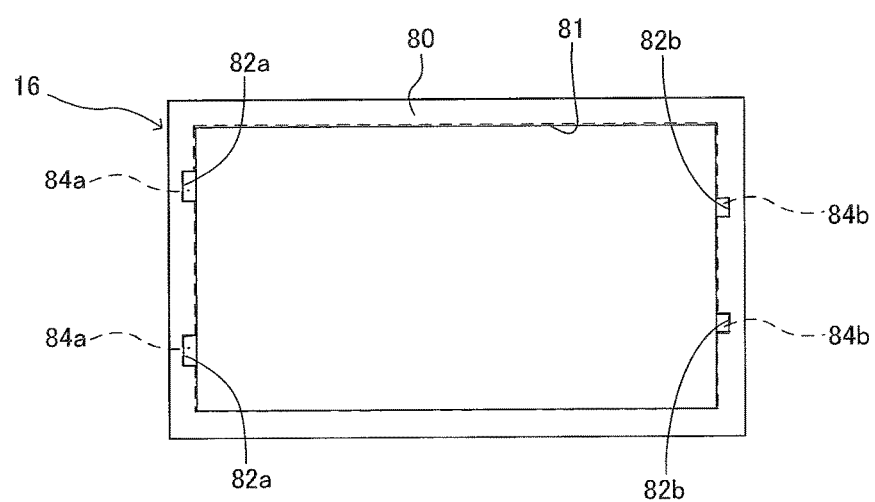
FIG. 7A illustrates a plurality of cases stacked on each other and oriented so that the stacking dimension over which the cases are stacked on each other in vertical directions reduces.
Figure 7B:
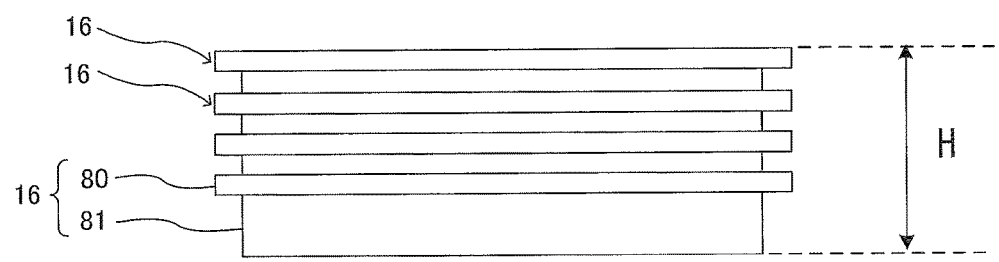
FIG. 7B is a side view of the plurality of cases stacked on each other and oriented so that the stacking dimension over which the cases are stacked on each other in the vertical directions reduces.

As illustrated in FIG. 7A, a plurality of cases 16 are oriented with the cutout grooves 82a meeting the protrusions 84a and with the cutout grooves 82b meeting the protrusions 84b. With the plurality of cases 16 in this orientation, the cases 16 are stacked on each other, in the vertical directions. Specifically, referring to the illustrated two cases 16 that are next to each other in the vertical directions, the two protrusions 84a of the upper case 16 (indicated by broken line) fit in the two cutout grooves 82a of the lower case 16 (indicated by solid line), and the two protrusions 84b of the upper case 16 fit in the two cutout grooves 82b of the lower case 16. Thus, as illustrated in FIG. 7B, the body 81 of the upper case 16 is comparatively deeply inserted in the body 81 of the lower case 16. This configuration reduces the stacking dimension, H, over which the plurality of cases 16 are stacked on each other in the vertical directions. This manner of stacking is employed when a plurality of cases 16 containing no food trays 14 are to be stored in the first storage 21.

Figure 8A:
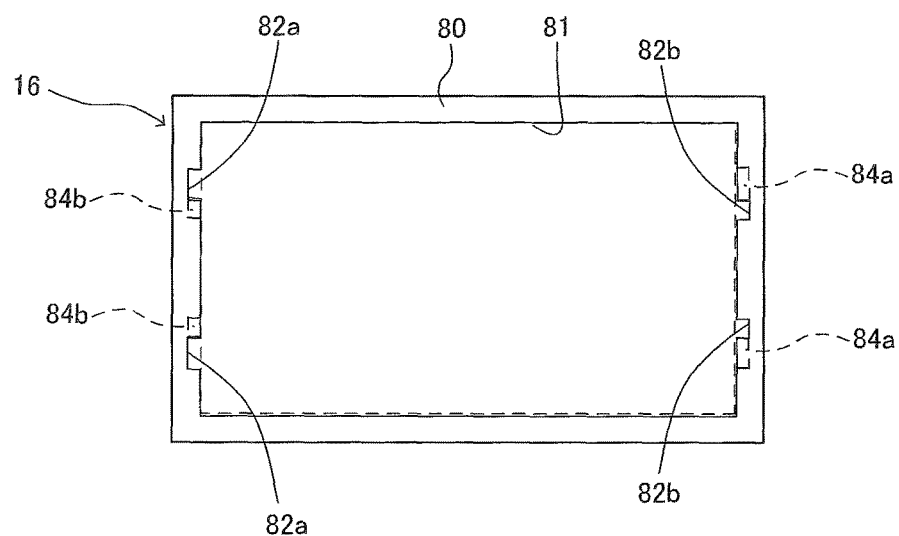
FIG. 8A illustrates a plurality of cases stacked on each other and oriented so that the stacking dimension over which the cases are stacked on each other in the vertical directions increases.
Figure 8B:
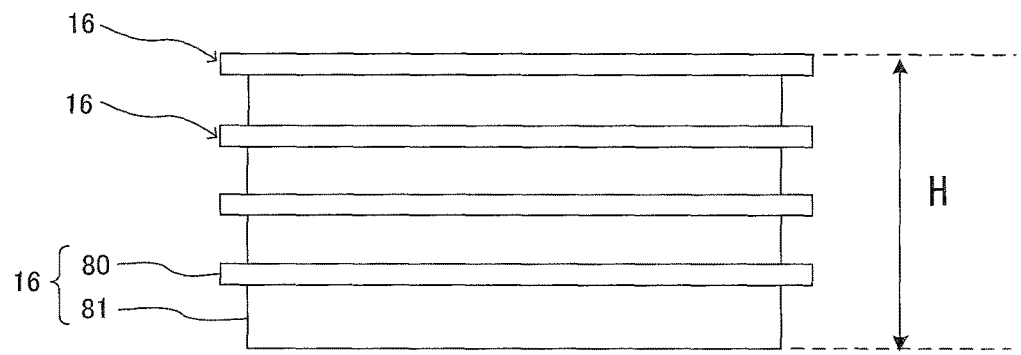
FIG. 8B is a side view of the plurality of cases stacked on each other and oriented so that the stacking dimension over which the cases are stacked on each other in the vertical directions increases.

As illustrated in FIG. 8A, a plurality of cases 16 are orientated with the cutout grooves 82a meeting the protrusions 84b and the cutout grooves 82b meeting the protrusions 84a. In other words, the upper case 16 oriented as illustrated in FIG. 7A is turned by 180 degrees about a direction (Z axis direction) perpendicular to the paper surface of FIG. 7A. With the plurality of cases 16 in this orientation, the cases 16 are stacked on each other. Specifically, referring to the illustrated two cases 16 that are next to each other in the vertical directions, the two protrusions 84b of the upper case 16 (indicated by broken line) do not fit in the two cutout grooves 82a of the lower case 16 (indicated by solid line), since the two protrusions 84b of the upper case 16 are different in position and size from the two cutout grooves 82a of the lower case 16. Similarly, the two protrusions 84a of the upper case 16 do not fit in the two cutout grooves 82b of the lower case 16, since the two protrusions 84a of the upper case 16 are different in position and size from the two cutout grooves 82b of the lower case 16. Thus, as illustrated in FIG. 8B, the body 81 of the upper case 16 is comparatively shallowly inserted in the body 81 of the lower case 16. This configuration increases the stacking dimension H, over which the plurality of cases 16 are stacked on each other in the vertical directions, and ensures that a space for food trays 14 is secured in the body 81 of each case 16. This manner of stacking is employed when a plurality of cases 16 containing food trays 14 are to be stored in the second storage 22.

It will be understood that the above-described structure of the case 16 is provided for exemplary purposes only, and the case 16 may have any other structure insofar as the stacking dimension H is variable depending on the orientation of the plurality of cases 16 stacked on each other. For example, while in this embodiment the cutout grooves and the protrusions are disposed on the shorter sides of the case 16, cutout grooves and protrusions may be disposed on the longer sides of the case 16, instead of or in addition to the cutout grooves and the protrusions disposed on the shorter sides of the case 16.

1-4. Exemplary Supply Operation Performed by Workpiece Handling Apparatus

By referring to FIG. 9, an exemplary supply operation performed by the upstream workpiece handling apparatus 3 will be described. To facilitate the understanding of the supply operation, cases 16, food trays 14, and associated objects are indicated by broken lines in FIG. 9.

Figure 9:
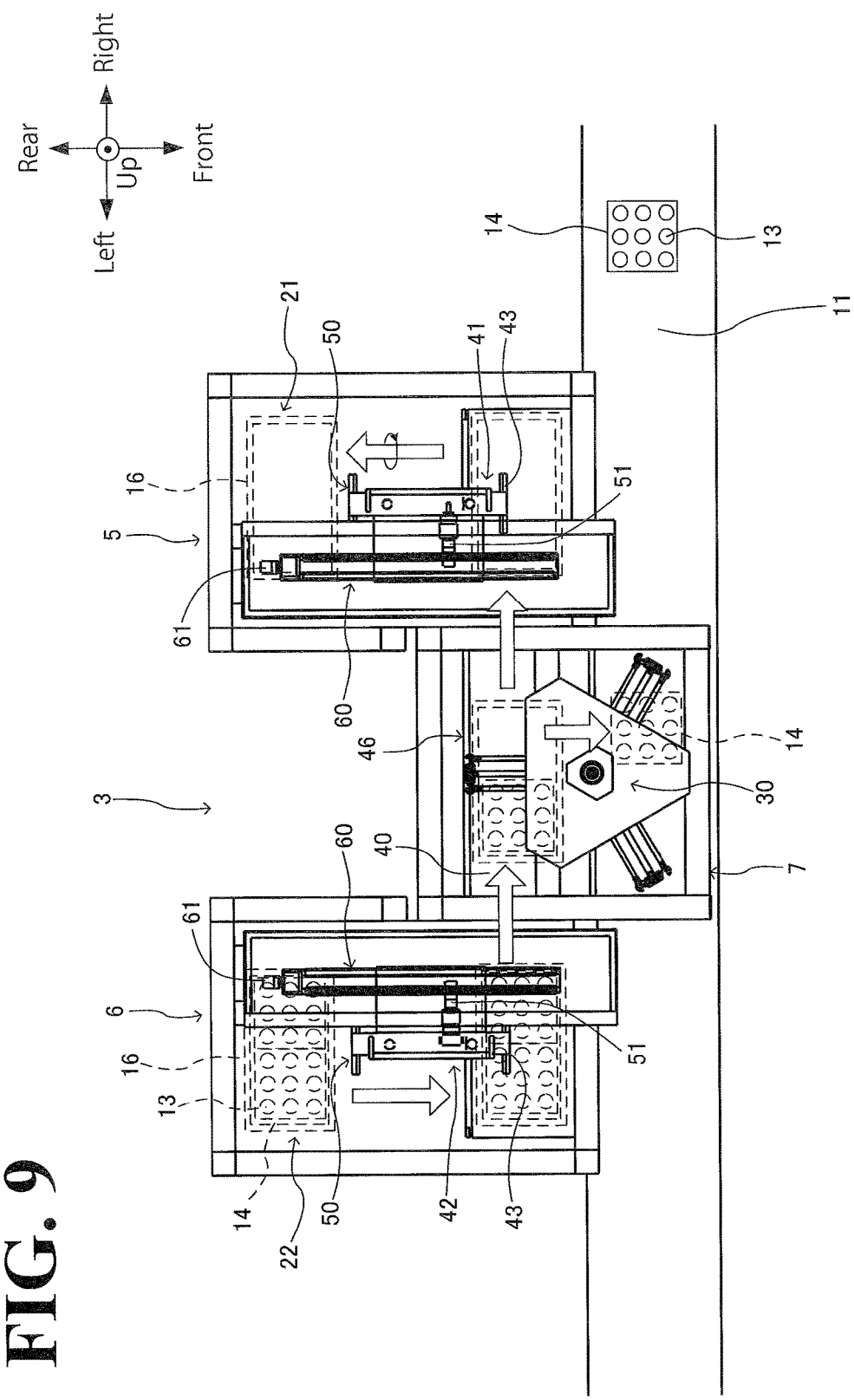
FIG. 9 illustrates an exemplary operation to supply a food tray performed by the workpiece handling apparatus according to the first embodiment.

As illustrated in FIG. 9, a first operation performed when the workpiece handling apparatus 3 supplies food trays 14 to the workpiece conveyor 11 is to store, in the second storage 22 of the second case transfer unit 6, a plurality of cases 16 containing food trays 14 each filled with food products 13 in such a manner that the plurality of cases 16 are stacked on each other in the vertical directions in the second storage 22. Also, the plurality of cases 16 are orientated with the cutout grooves 82a meeting the protrusions 84b and with the cutout grooves 82b meeting the protrusions 84a, as described above. This storing operation may be performed by the second case transfer robot 42 or another robot, or may be performed by an operator. Next, the Y axis motor 61 and the Z axis motor 51 of the second case transfer robot 42 respectively drive the horizontal movement mechanism 60 and the vertical movement mechanism 50 into operation to cause the robot hand 43 to move over the uppermost case 16 in the second storage 22 and hold this case 16. Next, the robot hand 43 holding the case 16 moves forward to transfer the case 16 from the second storage 22 to near one end (left end in FIG. 9) of the case conveyor 40. Then, the robot hand 43 releases the case 16 and places the case 16 on the case conveyor 40. In this manner, the second case transfer robot 42 transfers a case 16 in the second storage 22 to the case conveyor 40 at an appropriate timing.

Upon placement of the case 16 on the case conveyor 40, the case conveyor 40 conveys the case 16 to the work position 46 of the workpiece transfer robot 30 of the workpiece transfer unit 7. The workpiece transfer robot 30 controls the linkages 35 and the workpiece-holding hand 36 to hold, using the workpiece-holding hand 36, a food tray 14 contained in the case 16 conveyed to the work position 46 and to take the food tray 14 out of the case 16. Then, the workpiece transfer robot 30 moves the food tray 14 taken out of the case 16 to the workpiece conveyor 11 and releases the food tray 14, thus supplying the food tray 14 to the workpiece conveyor 11. When the case 16 becomes empty as a result of repeated supply of the food trays 14 from the case 16, the case conveyor 40 conveys the empty case 16 from the work position 46 to the first case transfer unit 5, and positions the case 16 at near another end (right end in FIG. 9) of the case conveyor 40.

In the first case transfer unit 5, the Y axis motor 61 and the Z axis motor 51 of the first case transfer robot 41 respectively drive the horizontal movement mechanism 60 and the vertical movement mechanism 50 into operation to cause the robot hand 43 to move over the case 16 on the case conveyor 40 and hold this case 16. Next, the robot hand 43 holding the case 16 moves rearward to transfer the case 16 from the case conveyor 40 to the first storage 21. Then, the robot hand 43 releases the case 16 and stores the case 16 in the first storage 21. Every time an empty case 16 is conveyed to the first case transfer unit 5, the first case transfer robot 41 transfers the empty case 16 to the first storage 21. In the first storage 21, the first case transfer robot 41 adds the empty case 16 to a stack of a plurality of empty cases 16 stacked on each other in the vertical directions. In the transfer of the cases 16 to the first storage 21, the first case transfer robot 41 causes the θ axis motor 44 to alternately turn the cases 16 by 180 degrees about the Z axis so as to orient the cases 16 such that the cutout grooves 82a meet the protrusions 84a and the cutout grooves 82b meet the protrusions 84b. This configuration reduces the stacking dimension H of the empty cases 16 in the first storage 21.

While in the above description the cases 16 are turned in the first case transfer unit 5, the cases 16 may be turned in the second case transfer unit 6. Specifically, in the transfer of the cases 16 from the second storage 22 to the case conveyor 40, the second case transfer robot 42 may cause the θ axis motor 44 to alternately turn the cases 16 by 180 degrees about the Z axis. This configuration eliminates the need for turning the cases 16 in the first case transfer unit 5.

1-5. Exemplary Discharge Operation Performed by Workpiece Handling Apparatus

By referring to FIG. 10, an exemplary discharge operation performed by the downstream workpiece handling apparatus 3 will be described. To facilitate the understanding of the discharge operation, cases 16, food trays 14, and associated objects are indicated by broken lines in FIG. 10.

Figure 10:
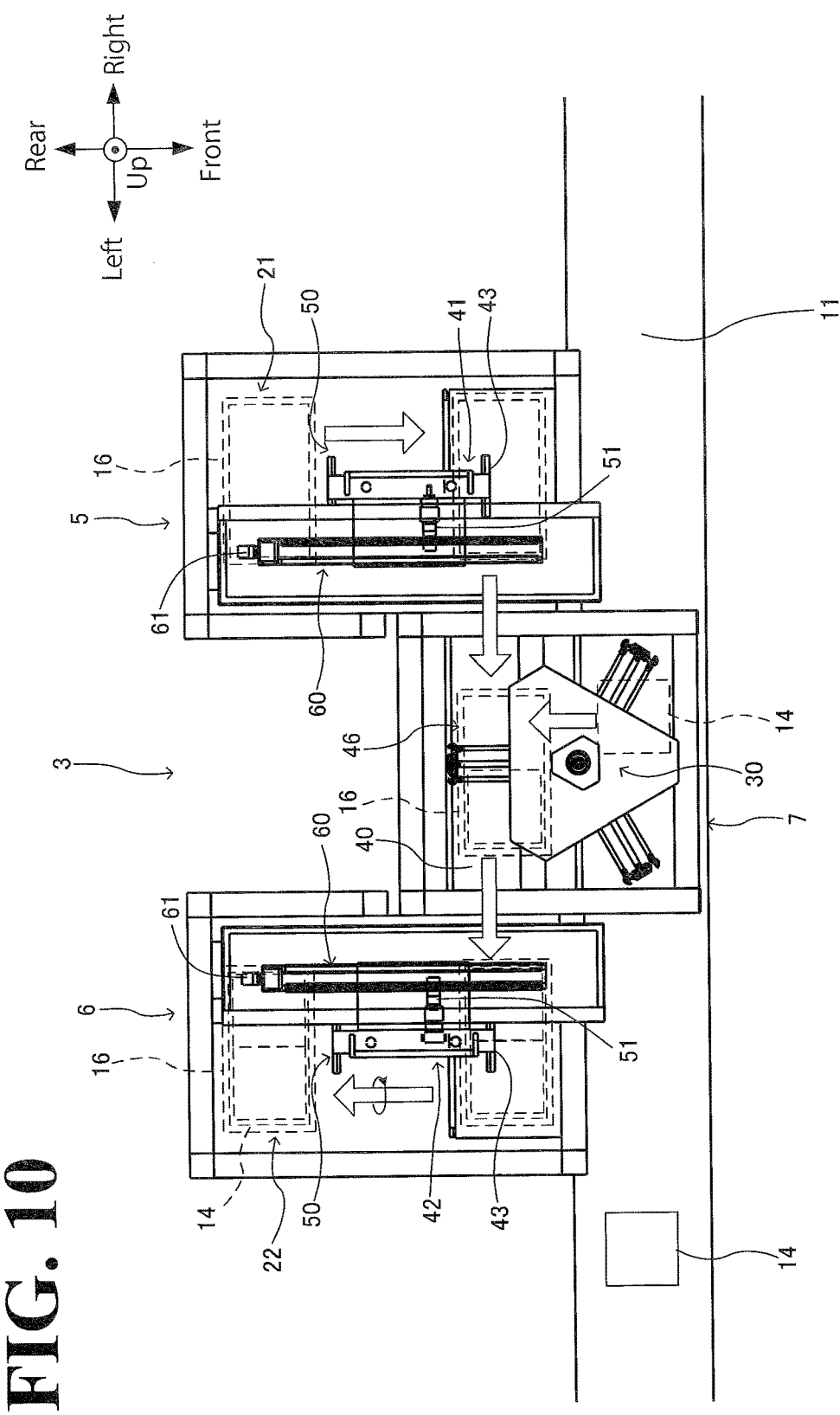
FIG. 10 illustrates an exemplary operation to discharge a food tray performed by the workpiece handling apparatus according to the first embodiment.

As illustrated in FIG. 10, a first operation performed when the workpiece handling apparatus 3 discharges food trays 14 from the workpiece conveyor 11 is to store, in the first storage 21 of the first case transfer unit 5, a plurality of empty cases 16, which contain no food trays 14, in such a manner that the plurality of empty cases 16 are stacked on each other in the vertical directions. Also, the plurality of empty cases 16 are orientated with the cutout grooves 82a meeting the protrusions 84b and with the cutout grooves 82b meeting the protrusions 84a, as described above. This storing operation may be performed by the first case transfer robot 41 or another robot, or may be performed by an operator. Next, the Y axis motor 61 and the Z axis motor 51 of the first case transfer robot 41 respectively drive the horizontal movement mechanism 60 and the vertical movement mechanism 50 into operation to cause the robot hand 43 to move over the uppermost case 16 of the first storage 21 and hold this case 16. Next, the robot hand 43 holding the case 16 moves forward to transfer the case 16 from the first storage 21 to near one end (right end in FIG. 10) of the case conveyor 40. Then, the robot hand 43 releases the case 16 and places the case 16 on the case conveyor 40. In this manner, the first case transfer robot 41 transfers a case 16 in the first storage 21 to the case conveyor 40 at an appropriate timing.

Upon placement of the case 16 on the case conveyor 40, the case conveyor 40 conveys the case 16 to the work position 46 of the workpiece transfer robot 30 of the workpiece transfer unit 7. The workpiece transfer robot 30 holds, using the workpiece-holding hand 36, the empty food tray 14 conveyed on the workpiece conveyor 11, moves the empty food tray 14 to a case 16 located at the work position 46, and places the empty food tray 14 in the case 16. In this manner, the empty food tray 14 is collected and discharged from the workpiece conveyor 11. When the case 16 is filled with food trays 14 as a result of repeated collection of the food trays 14 to the case 16, the case conveyor 40 conveys the case 16 filled with food trays 14 from the work position 46 to the second case transfer unit 6, and positions the case 16 at the other end (left end in FIG. 10) of the case conveyor 40.

In the second case transfer unit 6, the Y axis motor 61 and the Z axis motor 51 of the second case transfer robot 42 respectively drive the horizontal movement mechanism 60 and the vertical movement mechanism 50 into operation to cause the robot hand 43 to move over the case 16 on the case conveyor 40 and hold this case 16. Next, the robot hand 43 holding the case 16 moves rearward to transfer the case 16 from the case conveyor 40 to the second storage 22. Then, the robot hand 43 releases the case 16 and stores the case 16 in the second storage 22. Every time a case 16 containing empty food trays 14 is conveyed to the second case transfer unit 6, the second case transfer robot 42 transfers the case 16 to the second storage 22. In the second storage 22, the second case transfer robot 42 adds the case 16 to a stack of a plurality of such cases 16 stacked on each other in the vertical directions. In the transfer of the cases 16 to the second storage 22, the second case transfer robot 42 causes the θ axis motor 44 to alternately turn the cases 16 by 180 degrees about the Z axis so as to orient the cases 16 such that the cutout grooves 82a meet the protrusions 84b and the cutout grooves 82b meet the protrusions 84a. This configuration makes the stacking dimension H of the plurality of cases 16 in the second storage 22 large enough to avoid pressure against the food trays 14.

While in the above description the cases 16 are turned in the second case transfer unit 6, the cases 16 may be turned in the first case transfer unit 5. Specifically, in the transfer of the cases 16 from the first storage 21 to the case conveyor 40, the first case transfer robot 41 may cause the θ axis motor 44 to alternately turn the cases 16 by 180 degrees about the Z axis. This configuration eliminates the need for turning the cases 16 in the second case transfer unit 6.

1-6. Advantageous Effects of First Embodiment

As has been described hereinbefore, each of the workpiece handling apparatuses 3 supplies and/or discharges a food tray 14 to the workpiece conveyor 11, which is capable of conveying the food tray 14. The workpiece handling apparatus 3 includes a storage (corresponding to the first storage 21 and the second storage 22 in this embodiment), the conveyance device 48, and the workpiece transfer robot 30. In the storage, a case 16 for the food tray 14 is storable. The conveyance device 48 conveys the case 16 between the storage and the predetermined work position 46. The workpiece transfer robot 30 transfers the food tray 14 between the case 16 conveyed to the work position 46 and the workpiece conveyor 11.

When the workpiece handling apparatus 3 according to the first embodiment discharges a food tray 14 from the workpiece conveyor 11, the workpiece transfer robot 30 transfers the food tray 14 from the workpiece conveyor 11 to an empty case 16 conveyed to the work position 46 from the storage (the first storage 21 in this embodiment) by the conveyance device 48. When the workpiece handling apparatus 3 supplies a food tray 14 to the workpiece conveyor 11, the workpiece transfer robot 30 transfers the food tray 14 to the workpiece conveyor 11 from a case 16 that contains the food tray 14 and that has been conveyed to the work position 46 from the storage (the second storage 22 in this embodiment) by the conveyance device 48. In this manner, food trays 14 are automatically supplied and discharged to and from the workpiece conveyor 11, resulting in improved work efficiency and labor saving. Also, the storage, the conveyance device 48, and the workpiece transfer robot 30 of the workpiece handling apparatus 3 are consolidated as a single unit, which results in space saving. Additionally, the workpiece handling apparatus 3 serves two functions, namely, a supplier and a discharger, and thus a single workpiece handling apparatus 3 alone is necessary to implement the two functions.

Also in the first embodiment, the storage is made up of the first storage 21 and the second storage 22; when a food tray 14 is discharged from the workpiece conveyor 11, the conveyance device 48 conveys a case 16 in the first storage 21 to the work position 46 and conveys the case 16 from the work position 46 to the second storage 22; and when a food tray 14 is supplied to the workpiece conveyor 11, the conveyance device 48 conveys a case 16 in the second storage 22 to the work position 46 and conveys the case 16 from the work position 46 to the first storage 21.

The workpiece handling apparatus 3 includes the first storage 21 and the second storage 22. This configuration ensures that empty cases 16 are stored in the first storage 21 while cases 16 filled with food trays 14 are stored in the second storage 22. As a result, when a food tray 14 is discharged from the workpiece conveyor 11, the food tray 14 is collected to an empty case 16 conveyed to the work position 46 from the first storage 21, and the case 16 is conveyed to and stored in the second storage 22. When a food tray 14 is supplied to the workpiece conveyor 11, the food tray 14 is supplied to the workpiece conveyor 11 from a case 16 that has been conveyed to the work position 46 from the second storage 22 and that is filled with food trays 14. Then, the case 16 that has become empty as a result of taking food trays 14 out of the case 16 is conveyed to and stored in the first storage 21. This configuration significantly improves the work efficiency with which food trays 14 are discharged and supplied as compared with a case where there is only one storage.

Also in the first embodiment, the conveyance device 48 includes the case conveyor 40, the first case transfer robot 41, and the second case transfer robot 42. The case conveyor 40 conveys a case 16 along a passage including the work position 46. The first case transfer robot 41 transfers the case 16 between the first storage 21 and the case conveyor 40. The second case transfer robot 42 transfers the case 16 between the second storage 22 and the case conveyor 40.

Thus, robots are used to take a case 16 into and out of the first storage 21 and the second storage 22. Use of robots enables a case 16 to be taken into and out of the storages 21 and 22 while being conveyed in a plurality of axial directions (Z axis direction and Y axis direction) and turned. This configuration widens the variety of options for how to store cases 16 in the first storage 21 and the second storage 22, resulting in improved freedom of design of the storages 21 and 22.

Also in the first embodiment, the first storage 21 and the first case transfer robot 41 are unitized as the first case transfer unit 5, and the second storage 22 and the second case transfer robot 42 are unitized as the second case transfer unit 6.

This configuration ensures that the workpiece handling apparatus 3 is roughly made up of the first case transfer unit 5, the second case transfer unit 6, and the case conveyor 40. As a result, the workability of installment and/or relocation of the workpiece handling apparatus 3 improves. Also, the first storage 21 and the first case transfer robot 41 are unitized as a compact, single unit, and the second storage 22 and the second case transfer robot 42 are unitized as a compact, single unit, which results in additional space saving.

Also in the first embodiment, the first case transfer robot 41 and the second case transfer robot 42 each include the robot hand 43, the vertical movement mechanism 50, and the horizontal movement mechanism 60. The robot hand 43 holds a case 16. The vertical movement mechanism 50 moves the robot hand 43 in the vertical directions. The horizontal movement mechanism 60 moves the robot hand 43 in the horizontal directions perpendicular to the vertical directions (the horizontal directions are the front and rear directions in the first embodiment).

This configuration ensures that cases 16 are stored in the first storage 21 and the second storage 22 in such a manner that the cases 16 are stacked on each other in the vertical directions. Also, the vertical dimensions of the storages 21 and 22 and the stroke over which the vertical movement mechanism 50 moves are comparatively high. This configuration increases the capacity of the first storage 21 and the second storage 22.

Also in the first embodiment, the passage of the case conveyor 40 is along the conveyance direction of the workpiece conveyor 11, and the movement directions in which the first case transfer unit 5 and the second case transfer unit 6 are caused to move by the horizontal movement mechanism 60 are approximately perpendicular to the conveyance direction of the workpiece conveyor 11.

This configuration ensures that the case conveyor 40, which is lengthy in the conveyance direction, can be disposed in approximately parallel to the workpiece conveyor 11. This configuration, in turn, minimizes the depth dimension (dimension in the front and rear directions) of the workpiece handling apparatus 3. Also, the first case transfer unit 5 and the second case transfer unit 6 have approximately rectangular shapes lengthy in the movement directions in which the first case transfer unit 5 and the second case transfer unit 6 are caused to move by the horizontal movement mechanism 60. Such case transfer units 5 and 6 are disposed with their longitudinal sides approximately perpendicular to the workpiece conveyor 11. This configuration minimizes the width of the workpiece handling apparatus 3 (width in the right and left directions), resulting in additional space saving.

Also in the first embodiment, cases 16 are stored in the first storage 21 and the second storage 22 in such a manner that the cases 16 are stacked on each other in the vertical directions, and the stacking dimension over which the cases 16 are stacked on each other in the vertical directions is variable depending on the orientation of the cases 16 stacked on each other. Also, the first case transfer robot 41 and the second case transfer robot 42 each include the θ axis motor 44. The θ axis motor 44 (which may be a pneumatic turning mechanism) turns the robot hand 43 about the Z axis, which is parallel to the vertical directions.

This configuration ensures that cases 16 can be stored in the first storage 21, which stores empty cases 16, in such a manner that the cases 16 are stacked on each other and oriented so that the stacking dimension H reduces. This configuration, in turn, increases the capacity of the first storage 21 for cases 16. In contrast, in the second storage 22, which stores cases 16 containing food trays 14, such cases 16 are stored in such a manner that the cases 16 are stacked on each other and oriented so that the stacking dimension H increases. This configuration ensures that the cases 16 can be stacked on each other with enough space secured for food trays 14 (so that food trays 14 may not be crushed). Specifically, the θ axis motor 44 (which may be a pneumatic turning mechanism) of the first case transfer robot 41 or the second case transfer robot 42 implements the above-described orientations of the cases 16 when the cases 16 are taken into and out of the storages 21 and 22.

Also in the first embodiment, the workpiece transfer robot 30 is unitized as the workpiece transfer unit 7, and the workpiece transfer unit 7 includes the control box 32 and the support frame 31. In the control box 32, a controller that controls an operation of the workpiece transfer robot 30 is containable. The support frame 31 supports the workpiece transfer robot 30 and the control box 32 with the with the space S being defined between the workpiece transfer robot 30 and the control box 32 so that the case conveyor 40 is passed through the space S.

Thus, the control box 32 is disposed under the case conveyor 40, and the workpiece transfer robot 30 is disposed over the case conveyor 40. This configuration ensures that the workpiece transfer robot 30 and the control box 32 overlap the case conveyor 40 in plan view, resulting in additional space saving in that the workpiece handling apparatus 3 can be installed in reduced sizes of space.

Also in the first embodiment, the workpiece transfer robot 30 is a parallel link robot. This configuration ensures that food trays 14 can be transferred at higher speeds, with higher accuracy, and over wider ranges, resulting in improved work efficiency of the workpiece handling apparatus 3.

1-7. Modifications

Modifications will be described below.

1-7-1. Workpiece Handling Apparatus Used as Stocker

While in the first embodiment the workpiece handling apparatus 3 is used as a supplier and a discharger, the workpiece handling apparatus 3 may be used as a stocker that stores workpieces. A work line 1A according to this modification will be described by referring to FIGS. 11 and 12. To facilitate the understanding of the following stock operation, cases 16, food vessels 12, and associated objects are indicated by broken lines in FIGS. 11 and 12.

Figure 11:
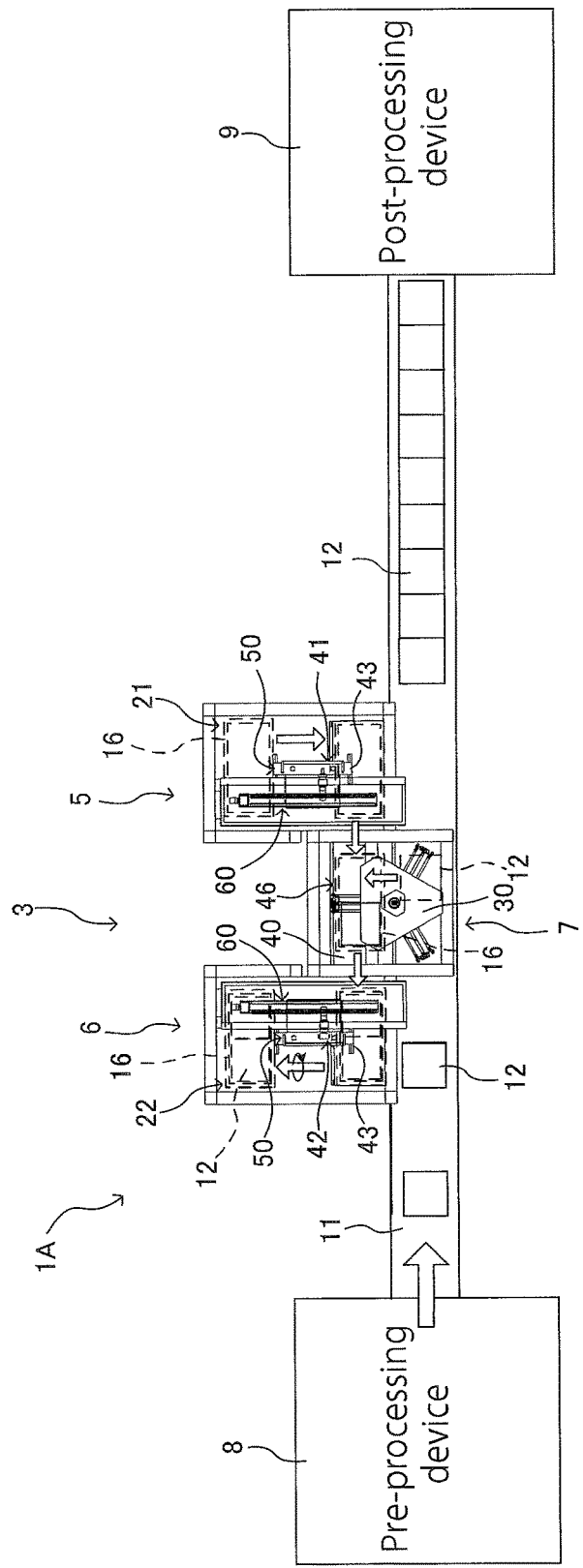
FIG. 11 illustrates an exemplary operation to store a food tray performed by the workpiece handling apparatus in a modification in which the workpiece handling apparatus is used as a stocker.
Figure 12:
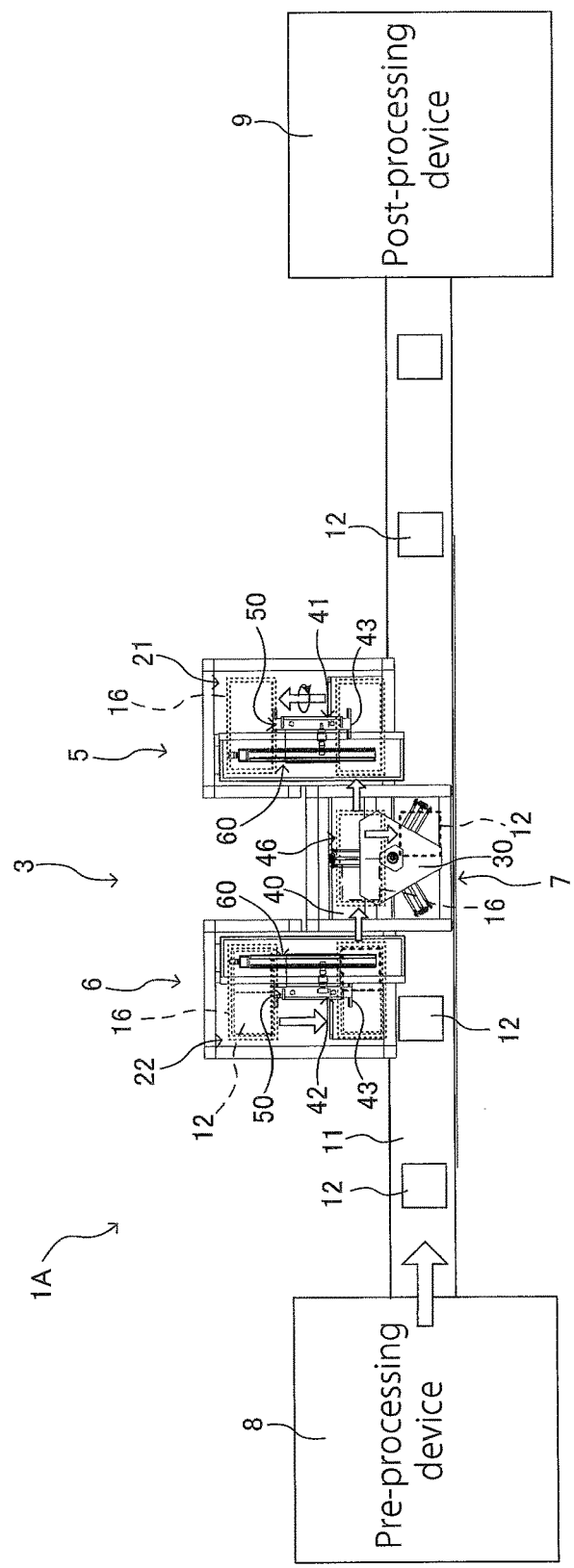
FIG. 12 illustrates an exemplary operation to return a food tray in stock to a workpiece conveyor in the modification in which the workpiece handling apparatus is used as a stocker.

As illustrated in FIGS. 11 and 12, the work line 1A according to this modification includes a pre-processing device 8, a post-processing device 9, a workpiece conveyor 11, and a workpiece handling apparatus 3. The pre-processing device 8 performs, for example, a process to arrange food products 13 in food vessels 12, and corresponds to elements including the work line 1 in the first embodiment. The post-processing device 9 performs a process to put a cover on a food vessel 12 in which food products 13 have been arranged by the pre-processing device 8.

The workpiece handling apparatus 3 according to this modification is disposed near the workpiece conveyor 11, collects food vessels 12 conveyed on the workpiece conveyor 11, temporarily stores (or buffers) the food vessels 12, and supplies the stored food vessels 12 to the workpiece conveyor 11. The workpiece handling apparatus 3 is similar in configuration to the workpiece handling apparatus 3 illustrated in FIGS. 2 to 5 and will not be elaborated upon here.

If there is a failure in the post-processing device 9 causing the workpiece conveyor 11 to be congested with food vessels 12 (which are non-limiting examples of the workpiece recited in the appended claims) as illustrated in FIG. 11, the workpiece handling apparatus 3 operates in the following manner. First, a plurality of empty cases 16 containing no food vessels 12 are stored in the first storage 21 of the first case transfer unit 5 in such a manner that the plurality of cases 16 are stacked on each other in the vertical directions. Also, the plurality of cases 16 are orientated with the cutout grooves 82a meeting the protrusions 84b and with the cutout grooves 82b meeting the protrusions 84a, as described above. This storing operation may be performed by the first case transfer robot 41 or another robot, or may be performed by an operator.

Next, the robot hand 43 of the first case transfer robot 41 holds an empty case 16, which contains no food vessels 12, from the first storage 21. Then, the robot hand 43 transfers the empty case 16 to the case conveyor 40. The case conveyor 40 conveys the empty case 16 to the work position 46 of the workpiece transfer robot 30 of the workpiece transfer unit 7. The workpiece transfer robot 30 collects, using the workpiece-holding hand 36, a food vessel 12 conveyed on the workpiece conveyor 11, moves the food vessel 12 to the empty case 16 located at the work position 46, and puts the food vessel 12 into the case 16. When the cases 16 becomes filled with food vessels 12, the case conveyor 40 conveys the case 16 from the work position 46 to the second case transfer unit 6.

In the second case transfer unit 6, the robot hand 43 of the second case transfer robot 42 transfers the case 16 from the case conveyor 40 to the second storage 22 and stores the case 16 in the second storage 22. In the transfer of such cases 16, the second case transfer robot 42 causes the θ axis motor 44 (which may be a pneumatic turning mechanism) to alternately turn the cases 16 by 180 degrees about the Z axis so as to orient the cases 16 such that the cutout grooves 82a meet the protrusions 84b and the cutout grooves 82b meet the protrusions 84a. The case 16 may be turned at the first case transfer unit 5. Thus, the workpiece handling apparatus 3 temporarily stores food vessels 12 in the second storage 22 until there is no longer a failure in the post-processing device 9. When the second storage 22 is filled with cases 16, some of the cases 16 are taken out of the second storage 22 as necessary.

As illustrated in FIG. 12, there is no longer a failure in the post-processing device 9, and the workpiece conveyor 11 is no longer congested with food vessels 12. In this state, the workpiece handling apparatus 3 operates in the following manner. In the second case transfer unit 6, the robot hand 43 of the second case transfer robot 42 takes a case 16 containing food vessels 12 out of the second storage 22, and transfers the case 16 to the case conveyor 40.

The case conveyor 40 conveys the case 16 to the work position 46 of the workpiece transfer robot 30 of the workpiece transfer unit 7. The workpiece transfer robot 30 takes, using the workpiece-holding hand 36, a food vessel 12 out of the conveyed case 16, moves the food vessel 12 to the workpiece conveyor 11, and re-supplies the food vessel 12 to the workpiece conveyor 11. When the case 16 located at the work position 46 becomes empty, the case conveyor 40 conveys the empty case 16 to the first case transfer unit 5.

In the first case transfer unit 5, the robot hand 43 of the first case transfer robot 41 transfers the empty case 16 from the case conveyor 40 to the first storage 22 and stores the empty case 16 in the first storage 22. In the transfer of such cases 16, the first case transfer robot 41 causes the θ axis motor 44 (which may be a pneumatic turning mechanism) to alternately turn the cases 16 by 180 degrees about the Z axis so as to re-orient the cases 16 such that the cutout grooves 82a meet the protrusions 84a and the cutout grooves 82b meet the protrusions 84b. The case 16 may be turned at the second case transfer unit 6.

This modification provides advantageous effects some of which are described below. Generally, a process line is constructed with a workpiece conveyor along which devices are aligned to perform their own processings. If a failure occurs in some device, it is desirable to discontinue the supply of food vessels to the device with the failure. It is sometimes or often the case that the process line cannot be stopped while the supply of food vessels to the device is discontinued and the device undergoes restoration. A measure in such an emergency is that a worker manually collects the food vessels 12 and temporarily stores the food vessels 12 in a container or a similar case, and when the restoration of the device is complete, the stored food vessels 12 are returned to the workpiece conveyor 11.

In the above-described modification, the workpiece handling apparatus 3 automatically performs the temporary storing of food vessels 12 and the supply of the food vessels 12 to the workpiece conveyor 11. This configuration eliminates the need for labor force in the above-described measure in an emergency, resulting in additional labor saving. Additionally, the workpiece handling apparatus 3 serves three functions, namely, a supplier, a discharger, and a stocker (also referred to as buffer), and thus a single workpiece handling apparatus 3 alone is necessary to implement the three functions.

1-7-2. Food Trays Conveyed in Two Lines on Workpiece Conveyor

Figure 13:
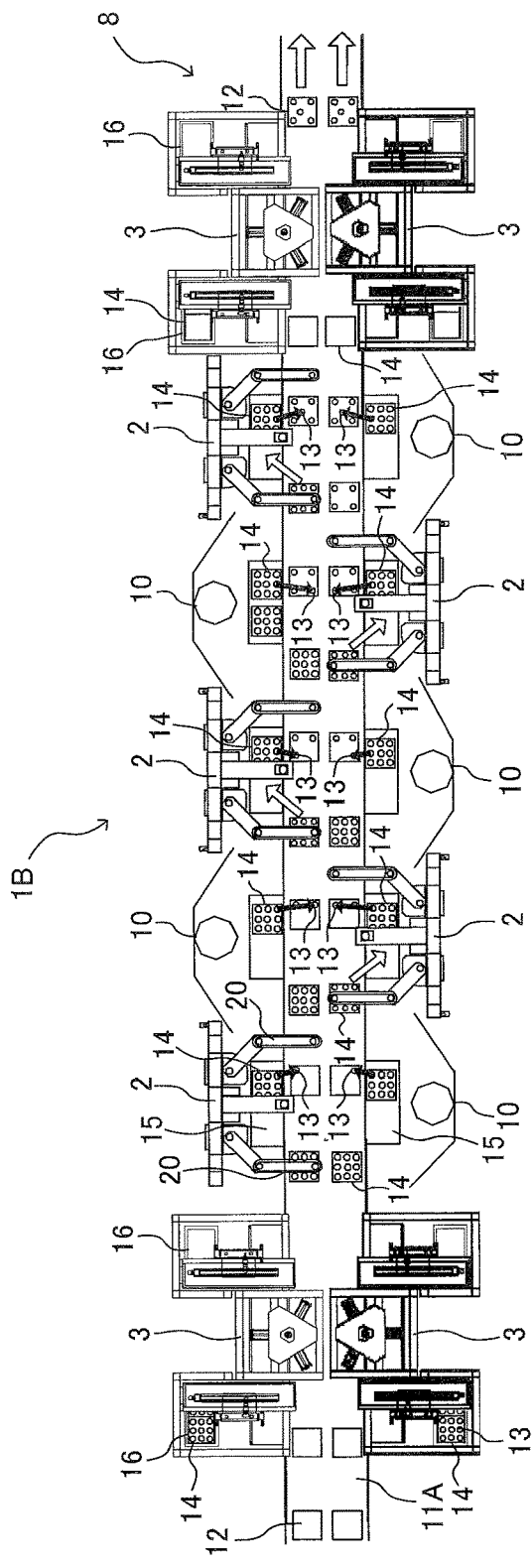
FIG. 13 illustrates a general arrangement of an exemplary work line in a modification in which food trays are conveyed in two lines on the workpiece conveyor.

While in the first embodiment the workpiece handling apparatus 3 conveys food trays 14 in one line on the workpiece conveyor 11, the workpiece handling apparatus 3 may convey food trays 14 in two lines on a wider workpiece conveyor. FIG. 13 illustrates an exemplary configuration of a work line 1B according to this modification.

As illustrated in FIG. 13, the work line 1B according to this modification includes a workpiece conveyor 11A. The workpiece conveyor 11A has a greater width dimension than the workpiece conveyor 11 according to the first embodiment. The workpiece conveyor 11A conveys two mixed lines of food vessels 12 and food trays 14. One of the two mixed lines is closer to one side of the width of the workpiece conveyor 11A (closer to the upper half of the workpiece conveyor 11A in FIG. 13), and the other mixed line is closer to the other side of the width of the workpiece conveyor 11A (closer to the lower half of the workpiece conveyor 11A in FIG. 13).

In the modification illustrated in FIG. 13, two workpiece handling apparatuses 3, three work robots 2, and two workers 10 are disposed at the one side of the width of the workpiece conveyor 11A (closer to the upper half of the workpiece conveyor 11A in FIG. 13), and two workpiece handling apparatuses 3, two work robots 2, and three workers 10 are disposed at the other side of the width of the workpiece conveyor 11A (closer to the lower half of the workpiece conveyor 11A in FIG. 13). Specifically, at the one side of the width of the workpiece conveyor 11A, the two workpiece handling apparatuses 3, the three work robots 2, and the two workers 10 are disposed in the following order, from the upstream side (left side of FIG. 13) toward the downstream side (right side of FIG. 13): the workpiece handling apparatus 3, the work robot 2, the worker 10, the work robot 2, the worker 10, the work robot 2, and the workpiece handling apparatus 3. At the other side of the width of the workpiece conveyor 11A, the two workpiece handling apparatuses 3, the two work robots 2, and the three workers 10 are disposed in the following order, from the upstream side toward the downstream side: the workpiece handling apparatus 3, the worker 10, the work robot 2, the worker 10, the work robot 2, the worker 10, and the workpiece handling apparatus 3. Across the width of the workpiece conveyor 11A, a work robot 2 and a worker 10 face each other, and a workpiece handling apparatus 3 and a workpiece handling apparatus 3 face each other.

The workpiece handling apparatuses 3 disposed at the upstream side of the workpiece conveyor 11A supply food trays 14 containing food products 13 to the workpiece conveyor 11A in two lines. Specifically, the workpiece handling apparatus 3 disposed at the one side of the width of the workpiece conveyor 11A supplies such food tray 14 to a position closer to the one side of the width of the workpiece conveyor 11A (closer to the upper half of the workpiece conveyor 11A in FIG. 13); and the workpiece handling apparatus 3 disposed at the other side of the width of the workpiece conveyor 11A supplies such food tray 14 to a position closer to the other side of the width of the workpiece conveyor 11A (closer to the lower half of the workpiece conveyor 11A in FIG. 13). The three work robots 2 and the two workers 10 disposed at the one side of the width of the workpiece conveyor 11A each collect a food tray 14 flowing from the upstream side and flowing in the line closer to the one side of the width of the workpiece conveyor 11A, take a food product 13 out of the food tray 14 corresponding to a food vessel 12 flowing in mixture with the food tray 14, and arrange the food product 13 to its position in the food vessel 12. The two work robots 2 and the three workers 10 disposed at the other side of the width of the workpiece conveyor 11A each collect a food tray 14 flowing from the upstream side and flowing in the line closer to the other side of the width of the workpiece conveyor 11A, take a food product 13 out of the food tray 14 corresponding to a food vessel 12 flowing in mixture with the food tray 14, and arrange the food product 13 to its position in the food vessel 12. The workpiece handling apparatuses 3 disposed at the downstream side of the workpiece conveyor 11A, namely, the workpiece handling apparatus 3 disposed at the one side of the width of the workpiece conveyor 11A and the workpiece handling apparatus 3 disposed at the other side of the width of the workpiece conveyor 11A collect food trays 14 returned to the workpiece conveyor 11A from the workers 10 and the work robots 2, and discharge the food trays 14 from the workpiece conveyor 11A. This modification is otherwise similar in configuration to FIG. 1.

In this modification, the number of food vessels 12 conveyable on the workpiece conveyor 11A is twice the number in the first embodiment, and the number of processes increases without making the workpiece conveyor 11A longer, resulting in a twofold increase in productivity. Additionally, a work robot 2 and a worker 10 face each other across the workpiece conveyor 11A. With this configuration, if there is a failure in the work robot 2, the worker 10 is able to take such a measure in an emergency as to temporarily perform the arrangement operation for the two lines in front of the worker 10, so as to avoid stopping of the process line.

1-7-3. Additional Notes

In the first embodiment and the above modifications, the first storage 21 stores empty cases 16, which contain no food trays 14, and the second storage 22 stores cases 16 containing food trays 14. Conversely, the second storage 22 may store empty cases 16, and the first storage 21 may store cases 16 containing food trays 14. In this configuration, the flow of supply of case 16 and the flow of discharge of case 16 described in FIGS. 9 and 10 may proceed in opposite directions to the directions illustrated in FIGS. 9 and 10.

Also in the first embodiment and the above modifications, each of the first case transfer robot 41 and the second case transfer robot 42 includes the θ axis motor 44 (which may be a pneumatic turning mechanism). In another possible embodiment, either the first case transfer robot 41 or the second case transfer robot 42 may include the θ axis motor 44 (which may be a pneumatic turning mechanism).

Also in the first embodiment and the above modifications, the workpiece handling apparatus 3 includes two storages 21 and 22. The number of storages, however, will not be limited to two, and the workpiece handling apparatus 3 may include one storage or three or more storages. For example, when a single storage is used, food trays 14 may be discharged by conveying an empty case 16 from the storage to the work position 46 and, after the workpiece transfer robot 30 has filled the case 16 with food trays 14, returning the case 16 to the storage. Also, when a single storage is used, food trays 14 may be supplied by conveying a case 16 containing food trays 14 from the storage to the work position 46 and, after the workpiece transfer robot 30 has removed all the food trays 14 from the case 16, returning the empty case 16 to the storage.

Also in the first embodiment and the above modifications, the work performed on the work lines 1, 1A, and 1B is food arrangement work. The food arrangement work, however, is not intended in a limiting sense. Another non-limiting example is assembly work of mounting machine parts and/or electrical parts onto housings of industrial products. Also in the first embodiment and the above modifications, the workpieces handled by the workpiece handling apparatus 3 are food trays 14 and food vessels 12. Other examples of possible workpieces include, but are not limited to, food products themselves such as rice balls and sandwiches, and machine parts and electrical parts, which are possible workpieces in assembly work.

2. Second Embodiment

A second embodiment will be described. In order to handle an increasing variety of products, there has been a growing need for space saving in work lines at factories, plants, and other industrial facilities. In light of this need, the workpiece handling apparatus according to the second embodiment has a simplified structure and a smaller size.

2-1. Configuration of Workpiece Handling Apparatus

By referring to FIGS. 14 and 16, an exemplary configuration of a workpiece handling apparatus 90 according to the second embodiment will be described. To avoid complicated illustration, the case 16 is indicated by broken lines in FIGS. 14 to 16.

Figure 16:
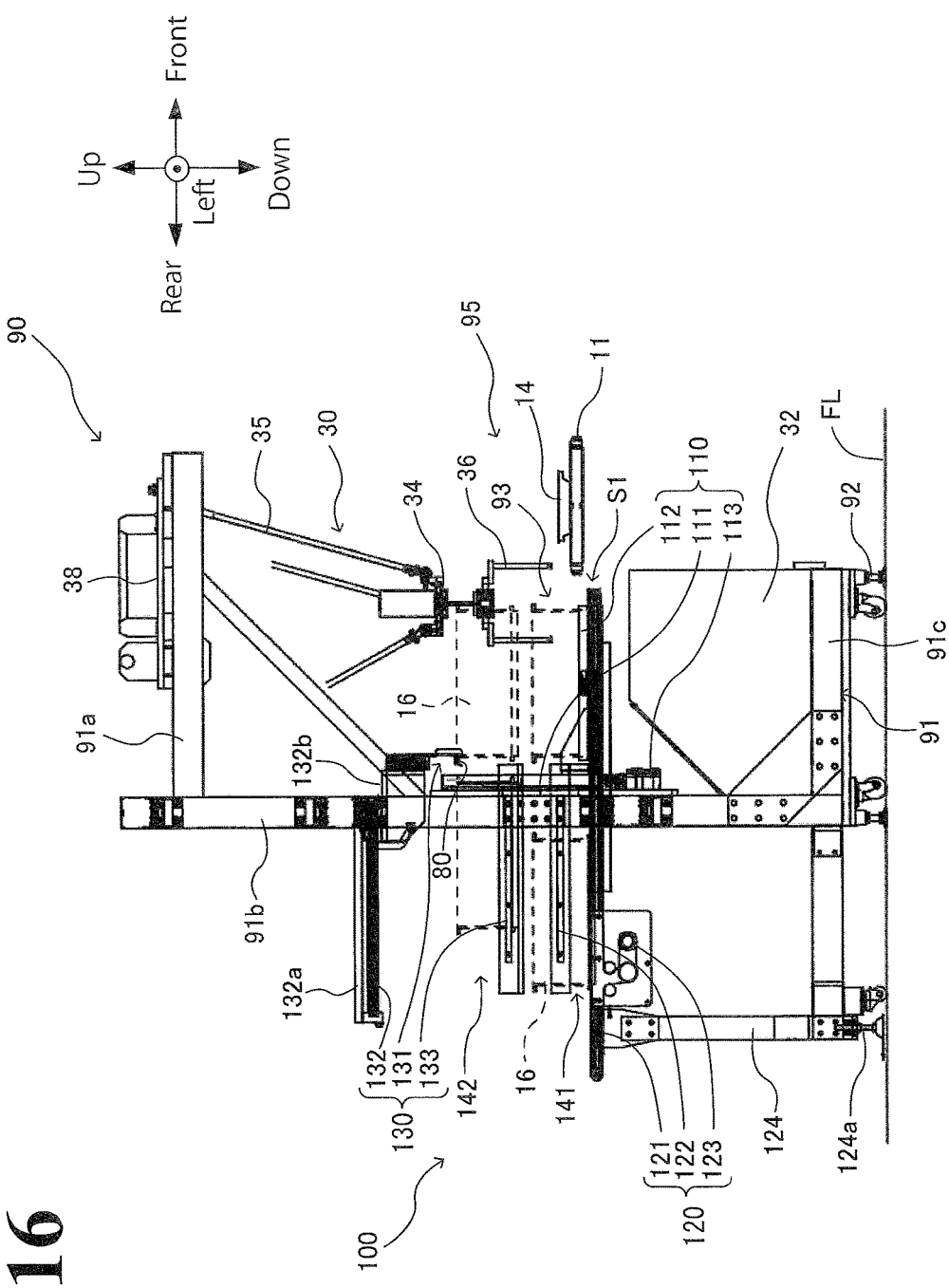
FIG. 16 is a left side view of the workpiece handling apparatus according to the second embodiment illustrating an exemplary configuration of this workpiece handling apparatus.

As illustrated in FIG. 16, the workpiece handling apparatus 90 includes a first storage 141 (which is a non-limiting example of the storage recited in the appended claims), a second storage 142 (which is a non-limiting example of the storage recited in the appended claims), a conveyance device 100, and a workpiece transfer robot 30. In the first storage 141 and the second storage 142, cases 16 for food trays 14 (which are non-limiting examples of the workpiece recited in the appended claims) are storable. The conveyance device 100 conveys cases 16 between the first storage 141 and a predetermined work position 93 and between the second storage 142 and the work position 93. The workpiece transfer robot 30 transfers food trays 14 between the workpiece conveyor 11 and a case 16 conveyed to the work position 93.

When food trays 14 are discharged from the workpiece conveyor 11, the conveyance device 100 conveys an empty case 16 stored in the first storage 141 to the work position 93. When the workpiece transfer robot 30 has filled the case 16 with food trays 14, the conveyance device 100 conveys the case 16 from the work position 93 to the second storage 142. When food trays 14 are supplied to the workpiece conveyor 11, the conveyance device 100 conveys, to the work position 93, a case 16 that is stored in the second storage 142 and that is filled with food trays 14. When the workpiece transfer robot 30 has made the case 16 empty, the conveyance device 100 conveys the case 16 from the work position 93 to the first storage 141.

The conveyance device 100 includes a first case conveyance mechanism 110, a second case conveyance mechanism 120, and a third case conveyance mechanism 130. The first case conveyance mechanism 110 conveys a case 16 along a vertical passage including the work position 93. The second case conveyance mechanism 120 conveys the case 16 between the first storage 141 and the first case conveyance mechanism 110 along an approximately horizontal passage. The third case conveyance mechanism 130 is disposed over the second case conveyance mechanism 120 and conveys the case 16 between the second storage 142 and the first case conveyance mechanism 110 along an approximately horizontal passage. It will be understood that the relative positions of the second case conveyance mechanism 120 and the third case conveyance mechanism 130 may be reversed, that is, the second case conveyance mechanism 120 may be disposed over the third case conveyance mechanism 130.

The work position 93 is located at the lower end of the vertical passage of the first case conveyance mechanism 110, that is, located at the front end of the approximately horizontal passage of the second case conveyance mechanism 120. The first storage 141 is disposed at the rear end of the approximately horizontal passage of the second case conveyance mechanism 120. The second storage 142 is disposed at the rear end of the approximately horizontal passage of the third case conveyance mechanism 130.

The workpiece transfer robot 30, the first case conveyance mechanism 110, the second case conveyance mechanism 120, and the third case conveyance mechanism 130 are unitized as a workpiece handling unit 95.

Figure 14:
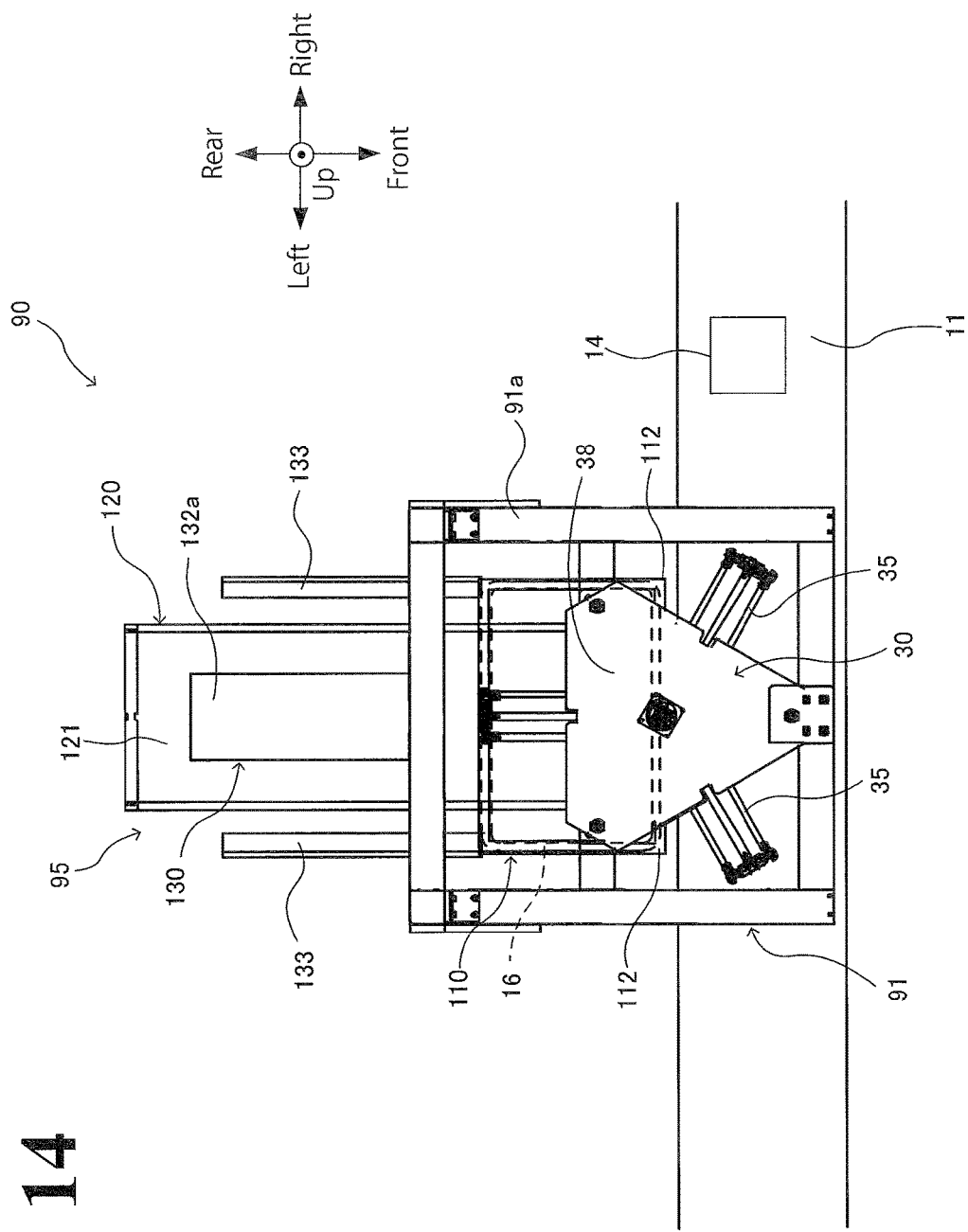
FIG. 14 is a plan view of a workpiece handling apparatus according to a second embodiment illustrating an exemplary configuration of this workpiece handling apparatus.

As illustrated in FIGS. 14 and 16, the workpiece handling unit 95 includes a support frame 91. The support frame 91 includes an upper frame 91a, a right main frame 91b, a left main frame 91b, and a lower frame 91c. Each main frame 91b supports the second case conveyance mechanism 120 and the third case conveyance mechanism 130 so that the installment positions of the second case conveyance mechanism 120 and the third case conveyance mechanism 130 overlap as viewed from a vertical direction (with the second case conveyance mechanism 120 at lower position and the third case conveyance mechanism 130 at upper position, in the second embodiment).

The upper frame 91a is disposed at an upper portion of the main frame 91b and protrudes frontward. On the upper frame 91a, the base 38 of the workpiece transfer robot 30 is mounted. The base 38 is connected with the movable plate 34 through three pairs of linkages 35. The movable plate 34 includes the workpiece-holding hand 36 at the lower end of the movable plate 34.

Figure 15:
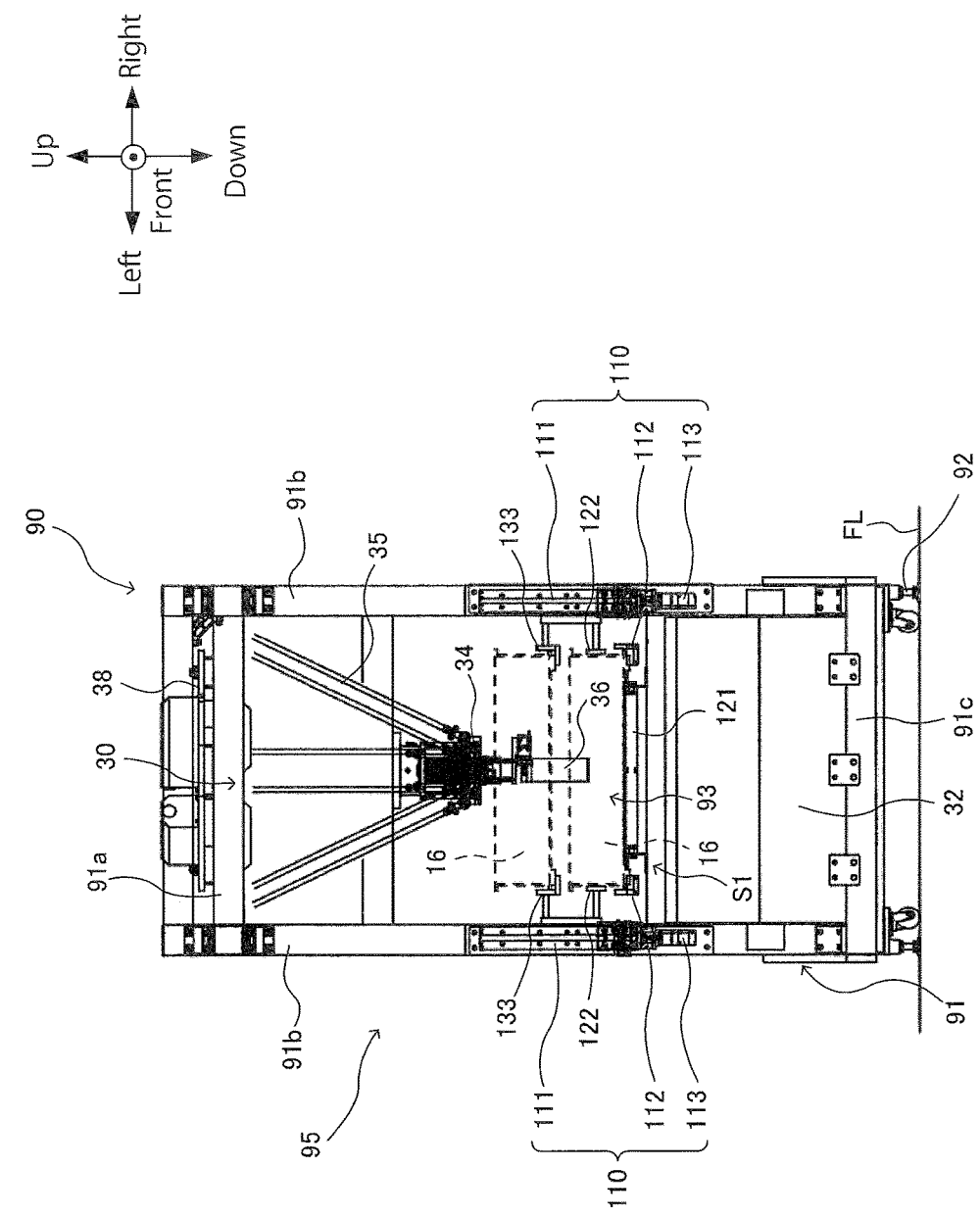
FIG. 15 is a front view of the workpiece handling apparatus according to the second embodiment illustrating an exemplary configuration of this workpiece handling apparatus.

As illustrated in FIGS. 15 and 16, the lower frame 91c is disposed at a lower portion of the main frame 91b and protrudes frontward. On the lower frame 91c, the control box 32 is disposed. The support frame 91 supports the workpiece transfer robot 30 and the control box 32 with space S1 being defined between the workpiece transfer robot 30 and the control box 32 so that one end of a case conveyor 121 is disposed in the space S1. Thus, the control box 32 is disposed under the case conveyor 121, and the workpiece transfer robot 30 is disposed over the case conveyor 121. Also at the upper frame 91a of the support frame 91, a workpiece detection camera, not illustrated, is disposed. The workpiece detection camera detects objects, such as food trays 14, on the workpiece conveyor 11. The lower frame 91c is provided with a plurality of castered adjusters 92 at the lower end of the lower frame 91c. On the plurality of castered adjusters 92, the lower frame 91c is disposed on the floor FL.

As illustrated in FIGS. 15 and 16, the first case conveyance mechanism 110 includes a case platform 112, Z axis motors 113, a right screw shaft 111, and a left screw shaft 111. The screw shafts 111 are ball screw mechanisms. The right screw shaft 111 is disposed on the right main frame 91b and extends in the vertical directions. The left screw shaft 111 is disposed on the left main frame 91b and extends in the vertical directions. The case platform 112 is a frame supporting the bottom of a case 16 and is vertically movably mounted on the screw shafts 111 through nuts, not illustrated. The Z axis motors 113 are rotary motors disposed on the lower ends of the screw shafts 111. By rotating the screw shafts 111, the Z axis motors 113 drive the case platform 112 in the vertical directions. With this configuration, the first case conveyance mechanism 110 conveys a case 16 supported on the case platform 112 along the vertical passage including the work position 93.

It will be understood that the first case conveyance mechanism 110 may use any other drive mechanism than ball screws. Other examples include, but are not limited to, a belt drive mechanism and a rack-and-pinion drive mechanism.

As illustrated in FIG. 16, the second case conveyance mechanism 120 includes the case conveyor 121 (which is a non-limiting example of the third conveyor recited in the appended claims), a conveyor motor 123, and a pair of guide rails 122.

The case conveyor 121 extends between the first storage 141 and the first case conveyance mechanism 110 (the work position 93). Specifically, the case conveyor 121 has a passage approximately perpendicular to the conveyance direction of the workpiece conveyor 11 (in this embodiment, the passage extends in the front and rear directions). As illustrated in FIG. 16, the space over the rear half of the case conveyor 121 constitutes the first storage 141. At the front end of the case conveyor 121, the case conveyor 121 is disposed between the workpiece transfer robot 30 and the control box 32. At an intermediate portion of the case conveyor 121 in the front and rear directions, the case conveyor 121 is supported by the main frames 91b of the support frame 91. At the rear end of the case conveyor 121, the case conveyor 121 is supported by a conveyor frame 124. At the lower end of the conveyor frame 124, castered adjusters 124a are disposed. On the castered adjusters 124a, the conveyor frame 124 is disposed on the floor FL.

As illustrated in FIGS. 15 and 16, the guide rails 122 are disposed at the right and left sides of the first storage 141 and extend in the front and rear directions so that the guide rails 122 contact the right and left sides of a case 16. The front ends of the guide rails 122 are mounted on the inner surfaces of the right and left main frames 91b of the support frame 91. The guide rails 122 contact vertically intermediate portions the right and left sides of a case 16 conveyed on the case conveyor 121 so as to guide the case 16 between the first storage 141 and the first case conveyance mechanism 110 (the work position 93).

The conveyor motor 123 is a rotary motor disposed at a lower portion of the case conveyor 121. The second case conveyance mechanism 120 drives the case conveyor 121 using the conveyor motor 123 to convey a case 16 between the first storage 141 and the first case conveyance mechanism 110 (the work position 93), in the front and rear directions, along an approximately horizontal passage. Meanwhile, the case 16 is guided by the guide rails 122.

As illustrated in FIG. 16, the third case conveyance mechanism 130 includes a hook 131, an actuator 132, and a pair of guide rails 133.

The hook 131 is mounted on, for example, the leading end of (front end) of a movable portion 132b of the actuator 132. The hook 131 is engageable with the brim 80 of a case 16 (the brim 80 is formed around the opening of the case 16). When the movable portion 132b is moved to front end position (which is over the work position 93), the hook 131 and the brim 80 are automatically engaged with each other or disengaged from each other by the vertical movement of the case 16 caused by the first case conveyance mechanism 110. When the movable portion 132*b* is moved to rear end position (in other words, when the case 16 is moved to the second storage 142), the hook 131 and the brim 80 are engaged with each other or disengaged from each other by an operator as the operator finds it necessary.

The actuator 132 includes a base 132*a* and the movable portion 132*b*. The base 132*a* is mounted on the main frames 91*b* over the second storage 142 and extends in the front and rear directions. The movable portion 132*b* makes predetermined strokes of movement in the front and rear directions along the base 132*a*. The actuator 132 moves the movable portion 132*b* in the front and rear directions to move the case 16 engaged with the hook 131 in the front and rear directions. Examples of the actuator 132 include, but are not limited to, an air cylinder, a ball screw drive mechanism, a belt drive mechanism, and a rack-and-pinion drive mechanism.

As illustrated in FIGS. 14 to 16, the guide rails 133 are disposed above the guide rails 122 of the second case conveyance mechanism 120 and extend in the front and rear directions so that the guide rails 133 support the bottom of the case 16 at right and left corners of the bottom. The front ends of the guide rails 133 are mounted on internal portions of the right and left main frames 91*b* of the support frame 91. Specifically, the guide rails 133 contact the right and left corners of the bottom of the case 16 conveyed by the hook 131 and guide the case 16 in the movement direction between the second storage 142 and the first case conveyance mechanism 110 (position over the work position 93).

The third case conveyance mechanism 130 causes the actuator 132 to drive the movable portion 132*b* to guide the case 16 on the guide rails 133, and, at the same time, causes the hook 131 to convey the case 16 between the second storage 142 and the first case conveyance mechanism 110 (predetermined position over the work position 93) through an approximately horizontal passage extending in the front and rear directions. As illustrated in FIG. 16, the space over the rear half of the guide rails 133 constitutes the second storage 142.

2-2. Discharge Operation Performed by Workpiece Handling Apparatus

By referring to FIG. 17, an exemplary discharge operation performed by the workpiece handling apparatus 90 will be described. To facilitate the understanding of the discharge operation, the case 16 is indicated by broken lines in FIG. 17.

Figure 17:
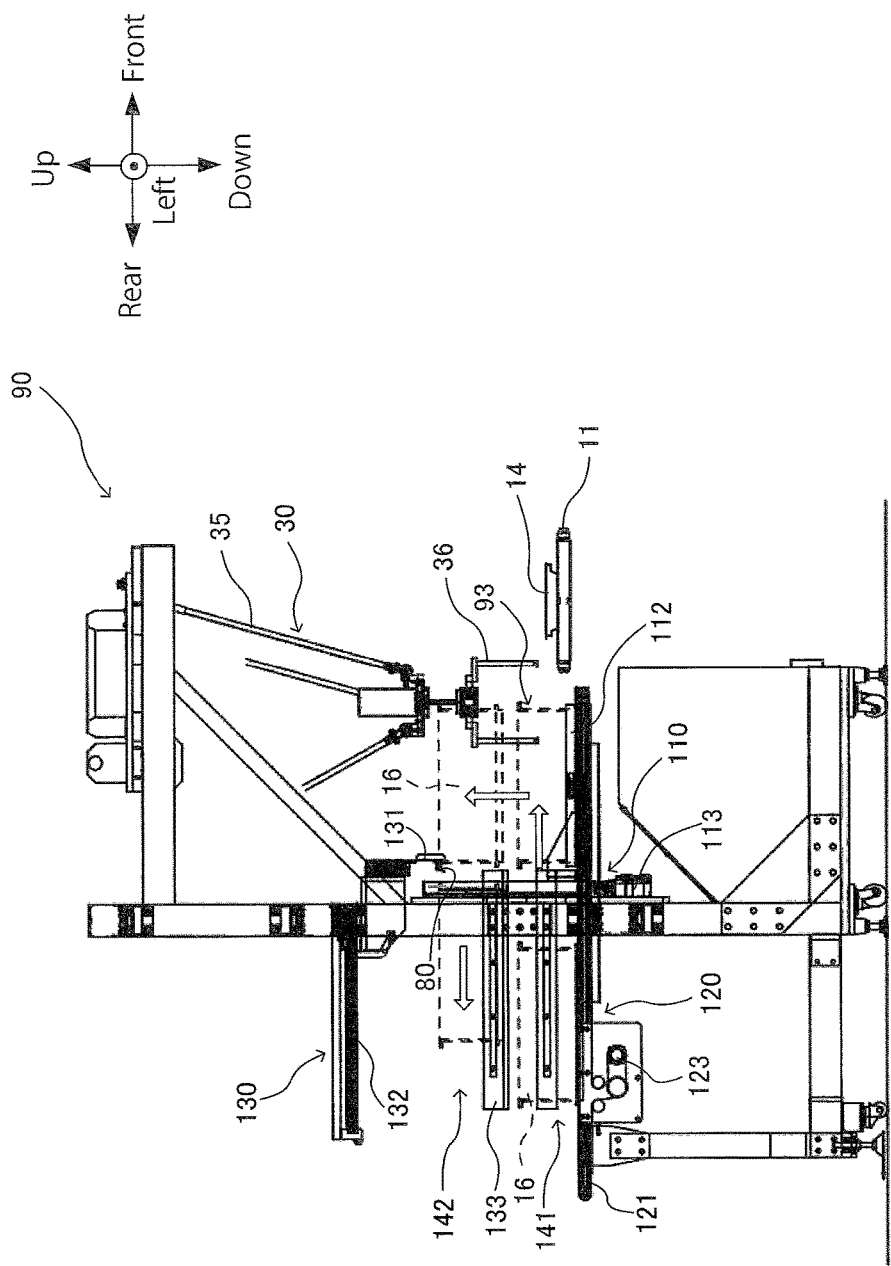
FIG. 17 illustrates an exemplary operation to discharge a food tray performed by the workpiece handling apparatus according to the second embodiment.

As illustrated in FIG. 17, a first operation performed when the workpiece handling apparatus 90 discharges food trays 14 from the workpiece conveyor 11 is that an operator places an empty case 16, which contains no food trays 14, at a predetermined position located at a rear portion of the case conveyor 121, that is, an operator places an empty case 16 places in the first storage 141. This placing operation may be performed by a robot, for example.

Next, the conveyor motor 123 of the second case conveyance mechanism 120 drives the case conveyor 121 to convey the case 16 from the first storage 141 to the work position 93 for the workpiece transfer robot 30. At the work position 93, the bottom of the case 16 is supported by the case platform 112 of the first case conveyance mechanism 110.

It will be understood that after the case 16 has been conveyed to the work position 93 by the case conveyor 121, the operator may place another empty case 16 in the first storage 141 before the previous case 16 is conveyed to the second storage 142 (for example, while the workpiece transfer robot 30 is in discharge operation). The another empty case 16 is kept in the first storage 141 until the work position 93 becomes empty.

The workpiece transfer robot 30 holds, using the workpiece-holding hand 36, an empty food tray 14, which contains no food products 13, when the empty food tray 14 is conveyed on the workpiece conveyor 11. Then, the workpiece transfer robot 30 moves the empty food tray 14 to the case 16 at the work position 93 and stores the empty food tray 14 in the case 16. In this manner, an empty food tray 14 is collected and discharged from the workpiece conveyor 11. This discharge operation is repeated until the case 16 is filled with food trays 14.

Next, the Z axis motors 113 of the first case conveyance mechanism 110 drive the screw shafts 111 into rotation, causing the case platform 112 to convey the case 16 upward from the work position 93 to the predetermined position over the work position 93. At the time when the case 16 reaches the predetermined position, the hook 131 of the third case conveyance mechanism 130 comes into engagement with the brim 80 of the case 16.

Next, the actuator 132 of the third case conveyance mechanism 130 causes the hook 131 to move the case 16 rearward to a predetermined position located at rear portions of the guide rails 133, that is, convey the case 16 to the second storage 142. After the case 16 has been conveyed to the second storage 142, the operator releases the engagement of the hook 131, thus removing the hook 131 from the case 16, and takes the case 16, which is now filled with food trays 14, out of the second storage 142.

2-3. Exemplary Supply Operation Performed by Workpiece Handling Apparatus

By referring to FIG. 18, an exemplary supply operation performed by the workpiece handling apparatus 90 will be described. To facilitate the understanding of the supply operation, the case 16 is indicated by broken lines in FIG. 18.

Figure 18:
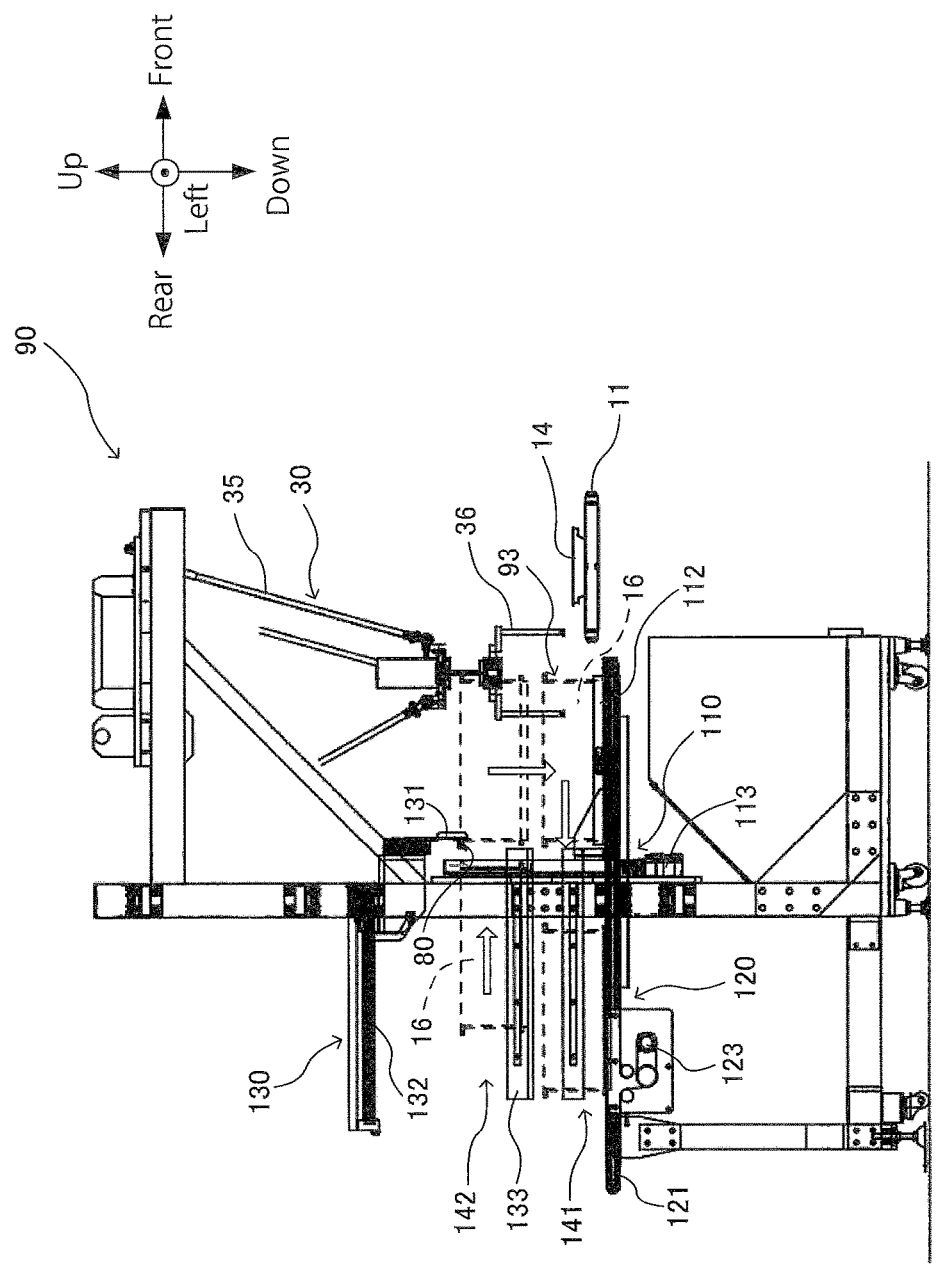
FIG. 18 illustrates an exemplary operation to supply a food tray performed by the workpiece handling apparatus according to the second embodiment.

As illustrated in FIG. 18, a first operation performed when the workpiece handling apparatus 90 supplies food trays 14 to the workpiece conveyor 11 is that the operator places in the second storage 142 a case 16 that contains food trays 14 each filled with food products 13. The second storage 142 is disposed at a predetermined position located at a rear portion of the guide rails 133. Then, the operator brings the hook 131 of the third case conveyance mechanism 130 into engagement with the brim 80 of the case 16. The placing operation and the engaging operation may be performed by a robot, for example.

Next, the actuator 132 of the third case conveyance mechanism 130 causes the hook 131 to move the case 16 forward from the second storage 142 to a position over the work position 93. At this position, the bottom of the case 16 is supported by the case platform 112 of the first case conveyance mechanism 110.

After the case 16 has been conveyed to the position over the work position 93 by the actuator 132, the operator may place another case 16 filled with food trays 14 in the second storage 142 before the previous case 16 is conveyed to the first storage 141 (for example, while the workpiece transfer robot 30 is in supply operation). The another empty case 16 is kept in the second storage 142 until the work position 93 becomes empty.

Next, the Z axis motors 113 of the first case conveyance mechanism 110 cause the case platform 112 to move the case 16 downward to the work position 93. At the work position 93, the hook 131 is automatically disengaged from the case 16 and removed from the case 16. The case 16 conveyed to the work position 93 is placed on the case conveyor 121 of the second case conveyance mechanism 120.

The workpiece transfer robot 30 holds, using the workpiece-holding hand 36, a food tray 14 contained in the case 16 conveyed to the work position 93, takes the food tray 14 out of the case 16, and transfers the food tray 14 to the workpiece conveyor 11. In this manner, a food tray 14 filled with food products 13 is supplied to the workpiece conveyor 11 from the case 16. This supply operation is repeated until the case 16 becomes empty.

When the case 16 becomes empty, the conveyor motor 123 of the second case conveyance mechanism 120 drives the case conveyor 121 to convey the empty case 16 from the work position 93 to the first storage 141. The operator takes out the empty case 16 conveyed to the first storage 141.

2-4. Exemplary Stock Operation Performed by Workpiece Handling Apparatus

Similarly to the first embodiment, the workpiece handling apparatus 90 may be used as a stocker that collects a food vessel 12 conveyed on the workpiece conveyor 11, temporarily stores (buffers) the food vessel 12, and supplies the stored food vessel 12 to the workpiece conveyor 11.

If there is a failure in the post-processing device 9 causing the workpiece conveyor 11 to be congested with food vessels 12 (which are non-limiting examples of the workpiece recited in the appended claims) as illustrated in FIG. 11, the operator first places an empty case 16, which contains no food vessels 12, in the first storage 141, which is over the case conveyor 121.

Next, the conveyor motor 123 of the second case conveyance mechanism 120 drives the case conveyor 121 to convey the case 16 from the first storage 141 to the work position 93. The workpiece transfer robot 30 collects, using the workpiece-holding hand 36, a food vessel 12 conveyed on the workpiece conveyor 11, moves the food vessel 12 to the case 16 at the work position 93, and stores the food vessel 12 in the case 16.

When the cases 16 becomes filled with food vessels 12, the first case conveyance mechanism 110 drives the Z axis motors 113, causing the case platform 112 to convey the case 16 to a position over the work position 93. At this position, the hook 131 of the third case conveyance mechanism 130 comes into engagement with the brim 80 of the case 16.

Then, the actuator 132 of the third case conveyance mechanism 130 causes the hook 131 to move the case 16 rearward to the second storage 142. The operator removes the hook 131 from the case 16 conveyed to the second storage 142, takes the case 16, which now contains food vessels 12, out of the second storage 142, and stores the case 16 in a container or another suitable stand-by place, where the case 16 is kept in stand-by state.

As illustrated in FIG. 12, there is no longer a failure in the post-processing device 9, and the workpiece conveyor 11 is no longer congested with food vessels 12. In this state, the operator first takes the case 16 out of the above-described stand-by place, places the case 16 in the second storage 142, and brings the hook 131 of the third case conveyance mechanism 130 into engagement with the brim 80 of the case 16. Next, the actuator 132 of the third case conveyance mechanism 130 causes the hook 131 to move the case 16 forward from the second storage 142 to a position over the work position 93.

Next, the Z axis motors 113 of the first case conveyance mechanism 110 cause the case platform 112 to move the case 16 downward to the work position 93 and to place the case 16 on the case conveyor 121 of the second case conveyance mechanism 120. The workpiece transfer robot 30 takes a food vessel 12 out of the case 16 conveyed to the work position 93, moves the food vessel 12 to the workpiece conveyor 11, and re-supplies the food vessel 12 to the workpiece conveyor 11.

When the case 16 at the work position 93 becomes empty as a result of repeated supply of the food vessels 12 from the case 16 to the workpiece conveyor 11, the conveyor motor 123 of the second case conveyance mechanism 120 drives the case conveyor 121 to convey the empty case 16 from the work position 93 to the first storage 141. The case 16 conveyed to the first storage 141 is taken out by the operator.

2-5. Advantageous Effects of Second Embodiment

The workpiece handling apparatus 90 according to the second embodiment provides automation-associated advantageous effects, such as improvement in work efficiency and labor saving, similarly to the first embodiment. In addition, the workpiece handling apparatus 90 according to the second embodiment provides the following advantageous effects.

In the workpiece handling apparatus 90 according to the second embodiment, the conveyance device 100 includes the first case conveyance mechanism 110, the second case conveyance mechanism 120, and the third case conveyance mechanism 130. The first case conveyance mechanism 110 conveys a case 16 along the vertical passage including the work position 93. The second case conveyance mechanism 120 conveys the case 16 between the first storage 141 and the first case conveyance mechanism 110. The third case conveyance mechanism 130 is disposed over the second case conveyance mechanism 120 and conveys the case 16 between the second storage 142 and the first case conveyance mechanism 110.

Thus, the second case conveyance mechanism 120 and the third case conveyance mechanism 130 are arranged side-by-side in the vertical directions, and the first case conveyance mechanism 110 is disposed near the work position 93 so that the first case conveyance mechanism 110 conveys the case 16 in the vertical directions near the work position 93. This configuration eliminates the need for arranging the transfer units (including the case transfer units 5 and 6 according to the first embodiment) at both sides of the width of the workpiece handling unit 95. As a result, the width dimension of the workpiece handling apparatus 90 is greatly reduced, enabling the workpiece handling apparatus 90 to be installed at greatly reduced sizes of space.

Also in the second embodiment, the workpiece transfer robot 30, the first case conveyance mechanism 110, the second case conveyance mechanism 120, and the third case conveyance mechanism 130 are unitized as the workpiece handling unit 95.

This configuration enables the workpiece handling apparatus 90 to be configured in the form of a single unit, resulting in improved workability of installment and/or relocation of the workpiece handling apparatus 90. Also, the workpiece transfer robot 30 and the first to third case conveyance mechanisms 110 to 130 are unitized as a compact, single unit, which results in additional space saving.

Also in the second embodiment, the workpiece handling unit 95 includes the support frame 91. The support frame 91 supports the second case conveyance mechanism 120 and the third case conveyance mechanism 130 so that the installment positions of the second case conveyance mechanism 120 and the third case conveyance mechanism 130 overlap as viewed from a vertical direction.

This configuration results in additional space saving in that the workpiece handling apparatus 90 can be installed in reduced sizes of space.

Also in the second embodiment, the second case conveyance mechanism 120 includes the case conveyor 121. The case conveyor 121 conveys the case 16 between the first storage 141 and the work position 93. The support frame 91 supports the workpiece transfer robot 30 and the control box 32, in which a controller to control an operation of the workpiece transfer robot 30 is containable, with the space S1 being defined between the workpiece transfer robot 30 and the control box 32 so that the case conveyor 121 is disposed in the space S1. This configuration provides advantageous effects some of which are described below.

In the workpiece handling apparatus 90 according to the second embodiment, the control box 32 is disposed under the case conveyor 121, and the workpiece transfer robot 30 is disposed over the case conveyor 121. This configuration ensures that the workpiece transfer robot 30 and the control box 32 overlap the case conveyor 121 in plan view, resulting in additional space saving in that the workpiece handling apparatus 90 can be installed in reduced sizes of space.

2-6. Modifications

Modifications will be described below.

2-6-1. Use of Conveyor to Implement Third Case Transfer Mechanism

In the second embodiment, the case conveyor 121 is used to implement the second case conveyance mechanism 120, and the actuator 132 and the hook 131 are used to implement the third case conveyance mechanism 130. This configuration, however, is not intended in a limiting sense; it is also possible to use a conveyor to implement the third case conveyance mechanism 130.

2-6-2. Use of Long Conveyor to Implement Second or Third Case Transfer Mechanism In the second embodiment, the case conveyor 121 of the second case conveyance mechanism 120 is a comparatively short-length conveyor that conveys a case 16 between the first storage 141 and the work position 93. This configuration, however, is not intended in a limiting sense. For example, the case conveyor 121 may be a longer conveyor extending beyond the first storage 141 in the rearward direction. In this configuration, the case conveyor 121 may form a line different from the work line 1. For example, such line may be a line on which food trays 14 are put into cases 16. In addition to this configuration, the above-described longer conveyor may be used to implement the third case conveyance mechanism 130 so as to form another circulating line different from the work line 1.

2-6-3. Differed Work Position

In the second embodiment, the work position 93 for the workpiece transfer robot 30 is located at the lower end of the vertical passage of the first case conveyance mechanism 110, that is, located at the front end of the approximately horizontal passage of the second case conveyance mechanism 120. This configuration, however, is not intended in a limiting sense. For example, the work position 93 may be located at the upper end of the vertical passage of the first case conveyance mechanism 110, that is, located at the front end of the approximately horizontal passage of the third case conveyance mechanism 130. Alternatively, the work position 93 may be located at anywhere else along the vertical passage of the first case conveyance mechanism 110.

2-6-4. Additional Notes

In the first and second embodiments and the above modifications, the first storage 141 stores empty cases 16, which contain no food trays 14, and the second storage 142 stores cases 16 that contain food trays 14. Conversely, the second storage 142 may store empty cases 16 and the first storage 141 may store cases 16 that contain food trays 14. In this configuration, the flow of supply of case 16 and the flow of discharge of case 16 described in FIGS. 17 and 18 may proceed in opposite directions to the directions illustrated in FIGS. 17 and 18.

Also in the first and second embodiments and the above modifications, the workpiece handling apparatus 90 includes two storages 141 and 142. The number of storages, however, will not be limited to two, and the workpiece handling apparatus 90 may include one storage or three or more storages. For example, when a single storage is used, food trays 14 may be discharged by conveying an empty case 16 from the storage to the work position 93 and, after the workpiece transfer robot 30 has filled the case 16 with food trays 14, returning the case 16 to the storage. Also, when a single storage is used, food trays 14 may be supplied by conveying a case 16 containing food trays 14 from the storage to the work position 93 and, after the workpiece transfer robot 30 has removed all the food trays 14 from the case 16, returning the empty case 16 to the storage.

Also in the first and second embodiments and the above modifications, the workpieces handled by the workpiece handling apparatus 90 are food trays 14. Other examples of possible workpieces include, but are not limited to, food products themselves such as rice balls and sandwiches, and machine parts and electrical parts, which are possible workpieces in assembly work of mounting machine parts and/or electrical parts onto housings of industrial products.

As used herein, the terms "perpendicular", "parallel", and "plane" may not necessarily mean "perpendicular", "parallel", and "plane", respectively, in a strict sense. Specifically, the terms "perpendicular", "parallel", and "plane" mean "approximately perpendicular", "approximately parallel", and "approximately plane", respectively, with design-related and production-related tolerance and error taken into consideration.

Also, when the terms "identical", "same", "equivalent", and "different" are used in the context of dimensions, magnitudes, sizes, or positions, these terms may not necessarily mean "identical", "same", "equivalent", and "different", respectively, in a strict sense. Specifically, the terms "identical", "same", "equivalent", and "different" mean "approximately identical", "approximately same", "approximately equivalent", and "approximately different", respectively, with design-related and production-related tolerance and error taken into consideration.

Otherwise, the above-described embodiments and modifications may be combined in any manner deemed suitable.

Obviously, numerous modifications and variations of the present disclosure are possible in light of the above teachings. It is therefore to be understood that within the scope of the appended claims, the present disclosure may be practiced otherwise than as specifically described herein.

What is claimed as new and desired to be secured by Letters Patent of the United States is:

1. A workpiece handling apparatus configured to supply and discharge a workpiece to and from a first conveyor configured to convey the workpiece, the workpiece handling apparatus comprising:
   a storage in which a case for the workpiece is storable;
   a conveyance device configured to convey the case between the storage and a predetermined work position; and a workpiece transfer robot provided configured to transfer the workpiece between the case conveyed to the work position and the first conveyor, wherein the storage comprises a first storage and a second storage, wherein the conveyance device is configured to convey the case between the first storage and the second storage without using the workpiece transfer robot, wherein when the workpiece is discharged from the first conveyor, the conveyance device is configured to convey the case in the first storage to the work position and configured to convey the case from the work position to the second storage, and wherein when the workpiece is supplied to the first conveyor, the conveyance device is configured to convey the case in the second storage to the work position and configured to convey the case from the work position to the first storage.

2. The workpiece handling apparatus according to claim 1, wherein the conveyance device comprises a second conveyor configured to convey the case along a passage comprising the work position;

a first case transfer robot configured to transfer the case between the first storage and the second conveyor; and a second case transfer robot configured to transfer the case between the second storage and the second conveyor.

3. The workpiece handling apparatus according to claim 2, wherein the workpiece transfer robot is unitized as a workpiece transfer unit comprising:

a control box in which a controller configured to control an operation of the workpiece transfer robot is containable; and a support frame supporting the workpiece transfer unit and the control box with a space being defined between the workpiece transfer unit and the control box so that the second conveyor is passed through the space.

4. The workpiece handling apparatus according to claim 2, wherein the first storage and the first case transfer robot are unitized as a first case transfer unit, and wherein the second storage and the second case transfer robot are unitized as a second case transfer unit.

5. The workpiece handling apparatus according to claim 4, wherein the first case transfer robot and the second case transfer robot each comprise a robot hand configured to hold the case, a vertical movement mechanism configured to move the robot hand in a vertical direction of the first case transfer robot and the second case transfer robot; and a horizontal movement mechanism configured to move the robot hand in a horizontal direction perpendicular to the vertical direction.

6. The workpiece handling apparatus according to claim 5, wherein the passage of the second conveyor is along a conveyance direction in which the first conveyor conveys the case, and wherein the first case transfer unit and the second case transfer unit are disposed so that the horizontal direction in which the horizontal movement mechanism moves the robot hand is perpendicular to the conveyance direction of the first conveyor.

7. The workpiece handling apparatus according to claim 5, wherein the case comprises a plurality of cases stackable on each other in the vertical direction in each of the first storage and the second storage, wherein a stacking dimension over which the plurality of cases are stacked on each other in the vertical direction is variable depending on an orientation of the plurality of cases stacked on each other in the vertical direction, and wherein at least one of the first case transfer robot and the second case transfer robot comprises a turning mechanism configured to turn the robot hand about an axis parallel to the vertical direction.

8. The workpiece handling apparatus according to claim 6, wherein the case comprises a plurality of cases stackable on each other in the vertical direction in each of the first storage and the second storage, wherein a stacking dimension over which the plurality of cases are stacked on each other in the vertical direction is variable depending on an orientation of the plurality of cases stacked on each other in the vertical direction, and wherein at least one of the first case transfer robot and the second case transfer robot comprises a turning mechanism configured to turn the robot hand about an axis parallel to the vertical direction.

9. The workpiece handling apparatus according to claim 1, wherein the conveyance device comprises a first case conveyance mechanism configured to transfer the case along a vertical passage comprising the work position, a second case conveyance mechanism configured to transfer the case between the first storage and the first case conveyance mechanism, and a third case conveyance mechanism disposed over or under the second case conveyance mechanism and configured to transfer the case between the second storage and the first case conveyance mechanism.

10. The workpiece handling apparatus according to claim 9, wherein the workpiece transfer robot, the first case conveyance mechanism, the second case conveyance mechanism, and the third case conveyance mechanism are unitized as a workpiece handling unit.

11. The workpiece handling apparatus according to claim 10, wherein the workpiece handling unit comprises a support frame supporting the second case conveyance mechanism and the third case conveyance mechanism so that an installment position of the second case conveyance mechanism and an installment position of the third case conveyance mechanism overlap each other as viewed from a vertical direction.

12. The workpiece handling apparatus according to claim 11, wherein the second case conveyance mechanism comprises a third conveyor configured to convey the case between the first storage and the work position, and wherein the support frame supports the workpiece transfer robot and a control box in which a controller configured to control an operation of the workpiece transfer robot is containable, a space being defined between the workpiece transfer robot and the control box so that the third conveyor is passed through the space.

13. The workpiece handling apparatus according to claim 1, wherein the workpiece transfer robot comprises a parallel link robot.

14. The workpiece handling apparatus according to claim 4, wherein the workpiece transfer robot is unitized as a workpiece transfer unit comprising:

a control box in which a controller configured to control an operation of the workpiece transfer robot is containable; and a support frame supporting the workpiece transfer unit and the control box with a space being defined between the workpiece transfer unit and the control box so that the second conveyor is passed through the space.

15. The workpiece handling apparatus according to claim 5, wherein the workpiece transfer robot is unitized as a workpiece transfer unit comprising:

a control box in which a controller configured to control an operation of the workpiece transfer robot is containable; and a support frame supporting the workpiece transfer unit and the control box with a space being defined between the workpiece transfer unit and the control box so that the second conveyor is passed through the space.

16. A method for supplying a workpiece to a first conveyor using a workpiece handling apparatus, the method comprising:

transferring a case containing the workpiece and contained in a second storage from the second storage to a case conveyor of the workpiece handling apparatus, by a second case transfer robot of the workpiece handling apparatus;

conveying the case containing the workpiece to a work position, by the case conveyor;

transferring the workpiece from the case to the first conveyor, by a workpiece transfer robot of the workpiece handling apparatus; and moving the case without the workpiece from the work position to a first storage, by the case conveyor and a first case transfer robot of the workpiece handling apparatus.

17. A method for storing a workpiece, conveyed on a first conveyor, using a workpiece handling apparatus, the method comprising:

conveying an empty case, contained in a first storage, from the first storage to a work position, by a conveyance device of the workpiece handling apparatus;

transferring the workpiece from the first conveyor to the case, by a workpiece transfer robot of the workpiece handling apparatus provided separately from the conveyance device;

conveying the case containing the workpiece from the work position to a second storage, by the conveyance device;

conveying the case in the second storage to the work position, by the conveyance device;

transferring the workpiece from the case to the first conveyor, by the workpiece transfer robot; and conveying the case without the workpiece from the work position to the first storage, by the conveyance device.

18. A workpiece handling system comprising:

a first conveyor configured to convey a workpiece; and a workpiece handling apparatus configured to supply and discharge the workpiece to and from the first conveyor, the workpiece handling apparatus comprising:

a storage in which a case for the workpiece is storable;

a conveyance device configured to convey the case between the storage and a predetermined work position; and a workpiece transfer robot configured to transfer the workpiece between the case conveyed to the work position and the first conveyor, wherein the storage comprises a first storage and a second storage, wherein the conveyance device is configured to convey the case between the first storage and the second storage without using the workpiece transfer robot, wherein when the workpiece is discharged from the first conveyor, the conveyance device is configured to convey the case in the first storage to the work position and configured to convey the case from the work position to the second storage, and wherein when the workpiece is supplied to the first conveyor, the conveyance device is configured to convey the case in the second storage to the work position and configured to convey the case from the work position to the first storage.

19. A method for discharging a workpiece from a first conveyor using a workpiece handling apparatus, the method comprising:

transferring an empty case, contained in a first storage, from the first storage to a case conveyor of the workpiece handling apparatus, by a first case transfer robot of the workpiece handling apparatus;

conveying the empty case to a work position, by the case conveyor;

transferring the workpiece from the first conveyor to the empty case, by a workpiece transfer robot of the workpiece handling apparatus; and moving the case containing the workpiece from the work position to a second storage, by the case conveyor and a second case transfer robot of the workpiece handling apparatus.

* * * * *